(12) United States Patent
Lv et al.

(10) Patent No.: US 10,996,438 B2
(45) Date of Patent: May 4, 2021

(54) IMAGING LENS ASSEMBLY

(71) Applicant: Zhejiang Sunny Optical Co., Ltd, Ningbo (CN)

(72) Inventors: Saifeng Lv, Ningbo (CN); Yabin Hu, Ningbo (CN); Jianke Wenren, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 440 days.

(21) Appl. No.: 16/073,464

(22) PCT Filed: Oct. 23, 2017

(86) PCT No.: PCT/CN2017/107331
§ 371 (c)(1),
(2) Date: Jul. 27, 2018

(87) PCT Pub. No.: WO2018/214396
PCT Pub. Date: Nov. 29, 2018

(65) Prior Publication Data
US 2021/0033819 A1 Feb. 4, 2021

(30) Foreign Application Priority Data

May 26, 2017 (CN) .......................... 201710383984.X
May 26, 2017 (CN) .......................... 201720600009.5

(51) Int. Cl.
*G02B 13/00* (2006.01)
*G02B 27/00* (2006.01)
(Continued)

(52) U.S. Cl.
CPC ........... *G02B 13/0045* (2013.01); *G02B 9/60* (2013.01); *G02B 13/02* (2013.01); *G02B 27/0025* (2013.01)

(58) Field of Classification Search
CPC ........... G02B 13/0045; G02B 27/0025; G02B 13/02; G02B 9/60
See application file for complete search history.

(56) References Cited

U.S. PATENT DOCUMENTS 4,787,721 A * 11/1988 Fukushima .............. G02B 9/60
359/713
7,864,454 B1 1/2011 Tang et al.
(Continued)

FOREIGN PATENT DOCUMENTS

CN 105988186 A 10/2016
CN 106990508 A 7/2017

*Primary Examiner* — Wen Huang
(74) *Attorney, Agent, or Firm* — Hauptman Ham, LLP

(57) ABSTRACT

The present disclosure discloses an imaging lens assembly which includes, sequentially from an object side to an image side along an optical axis, a first lens to a fifth lens. The first lens has a positive refractive power and a convex object-side surface. The second lens has a negative refractive power, a concave object-side surface and a concave image-side surface. The third lens has a negative refractive power. The fourth lens has a positive or a negative refractive power. The fifth lens has a positive or a negative refractive power, a concave object-side surface, and an image-side surface of the fifth lens is a convex surface or a plane. An air spacing T23 between the second lens and the third lens on the optical axis and an air spacing T34 between the third lens and the fourth lens on the optical axis satisfy: 1.0≤T23/T34<2.0.

14 Claims, 12 Drawing Sheets

(51) Int. Cl.
 *G02B 13/02* (2006.01)
 *G02B 9/60* (2006.01)

(56) References Cited

U.S. PATENT DOCUMENTS

| | | |
|---|---|---|
| 2011/0249346 A1 | 10/2011 | Tang et al. |
| 2012/0314302 A1 | 12/2012 | Tang et al. |
| 2013/0077181 A1 | 3/2013 | Chen et al. |
| 2017/0102524 A1* | 4/2017 | Jo ............................ G02B 9/60 |
| 2020/0096732 A1* | 3/2020 | Lee .................... G02B 13/0045 |

* cited by examiner

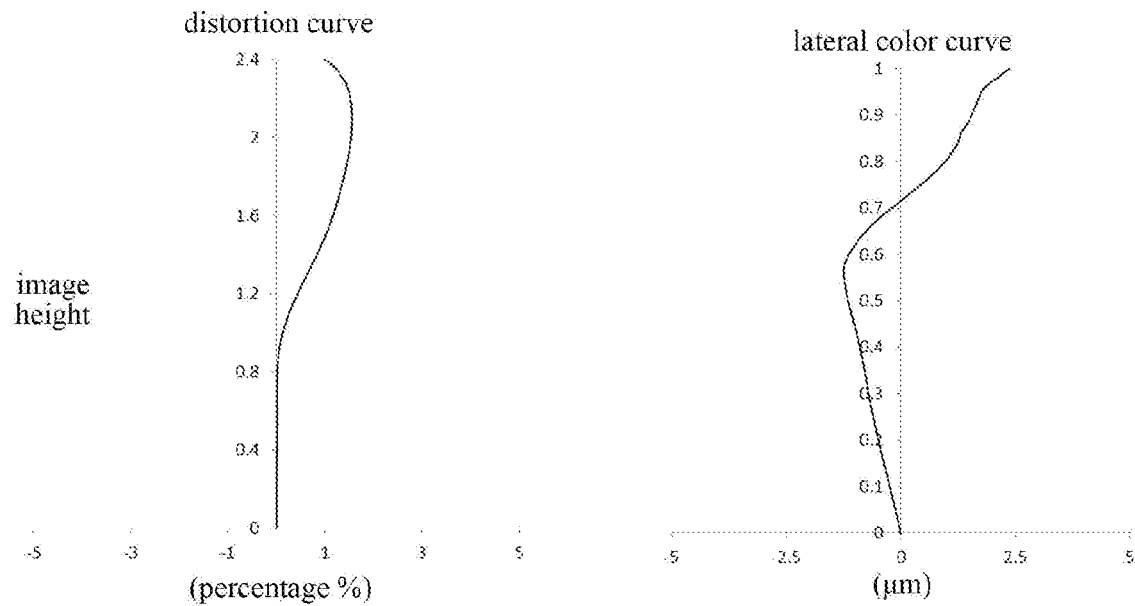
Fig. 6C
Fig. 6D
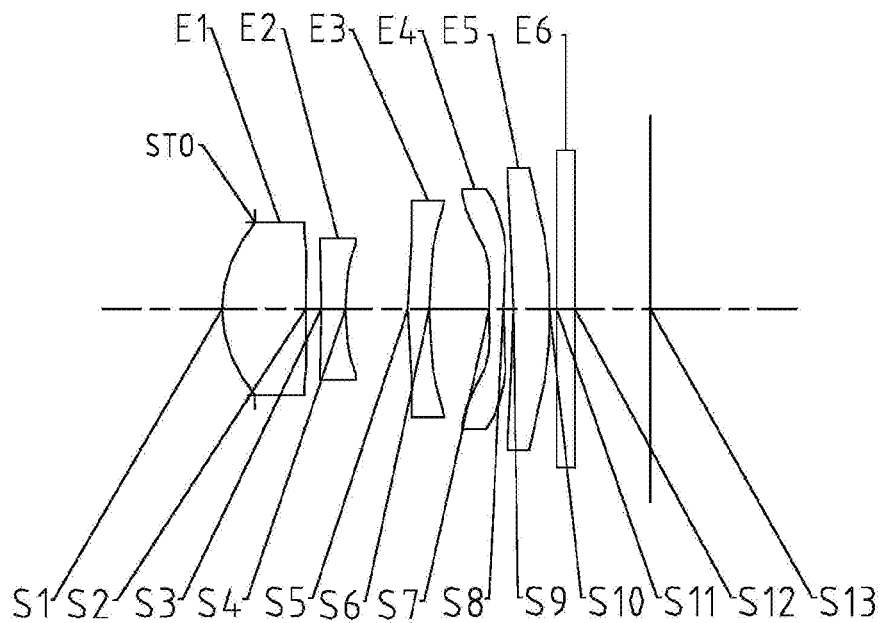
Fig. 7

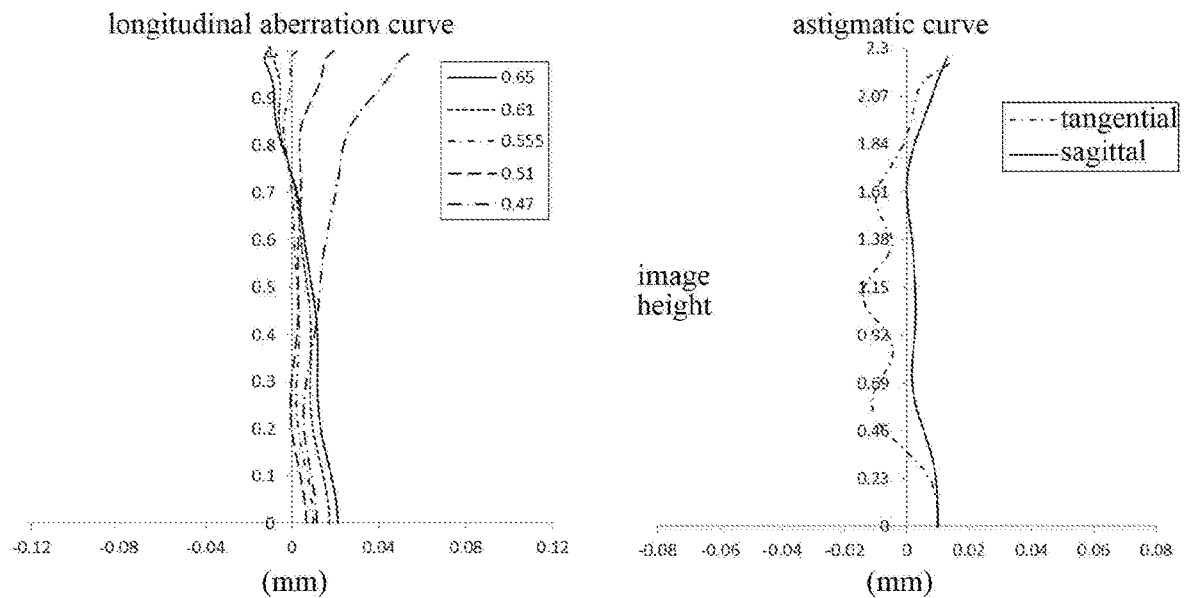
Fig. 8A
Fig. 8B
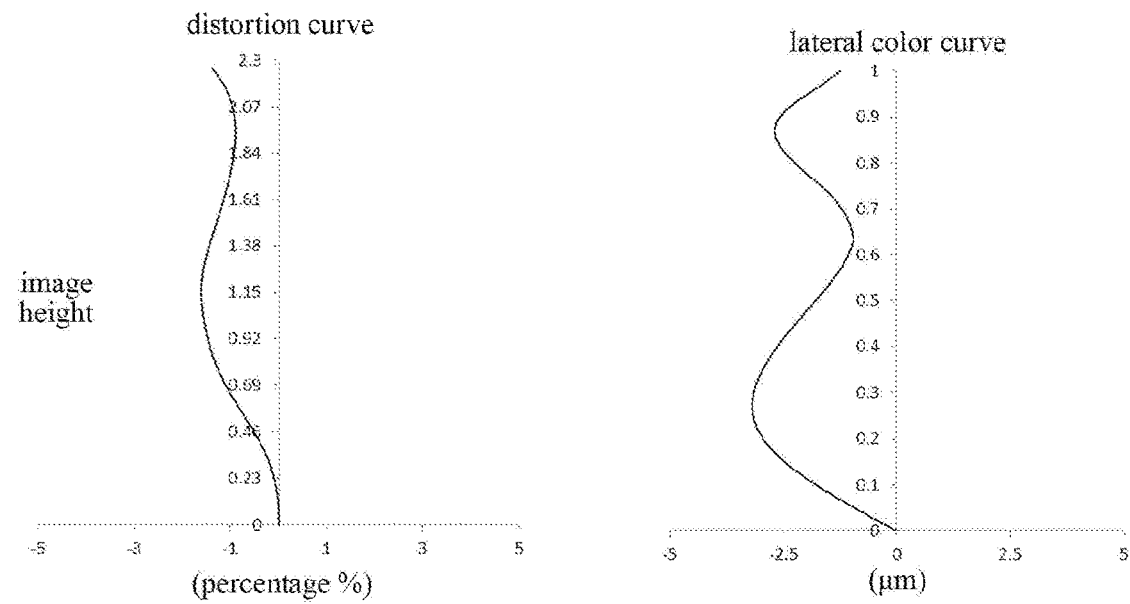
Fig. 8C
Fig. 8D

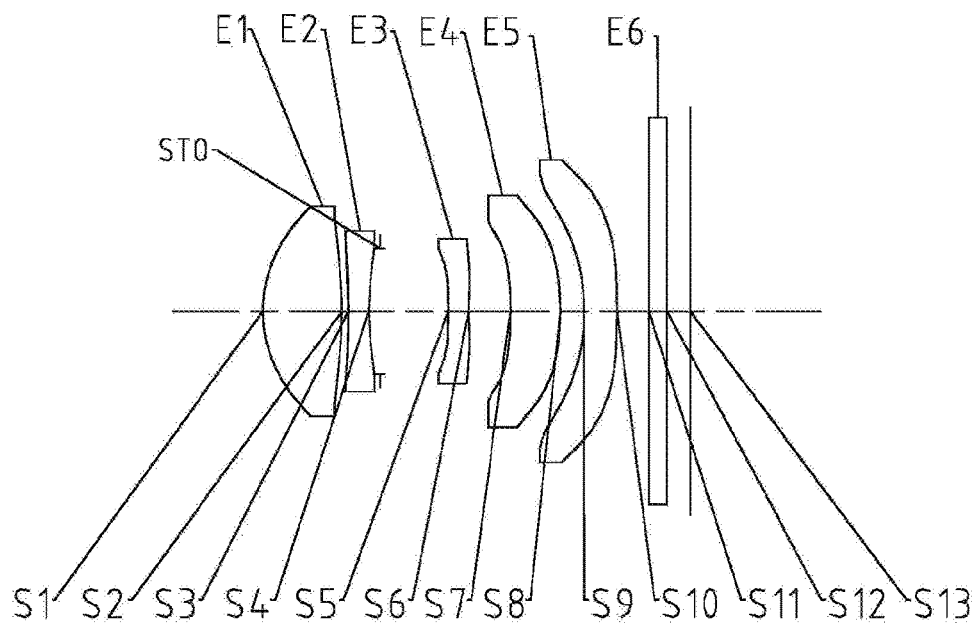
Fig. 9
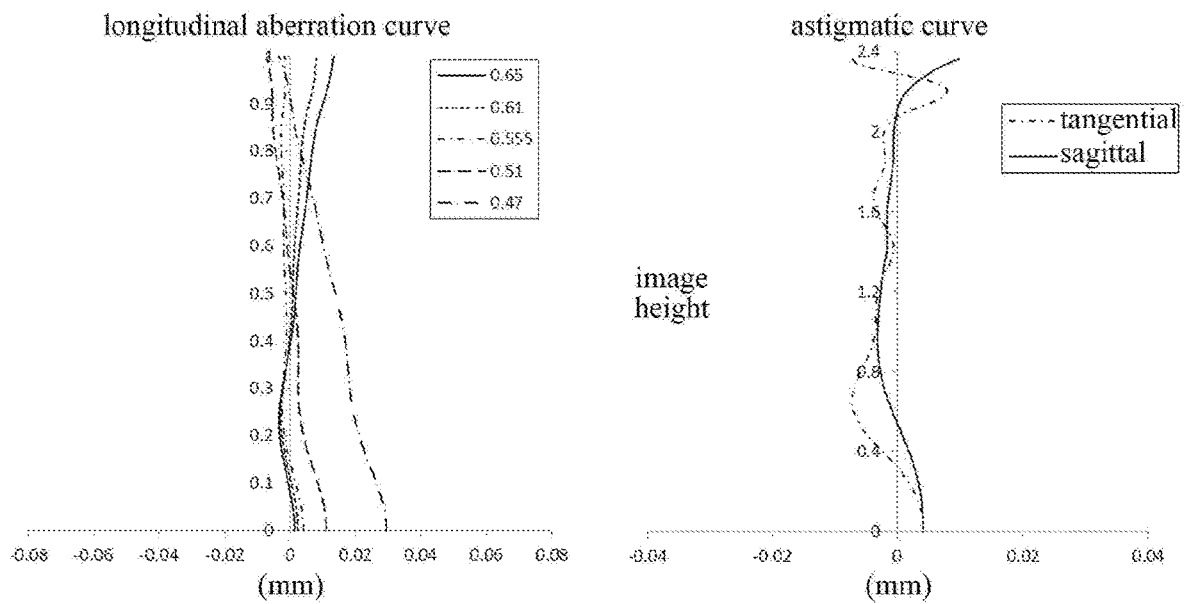
Fig. 10A
Fig. 10B

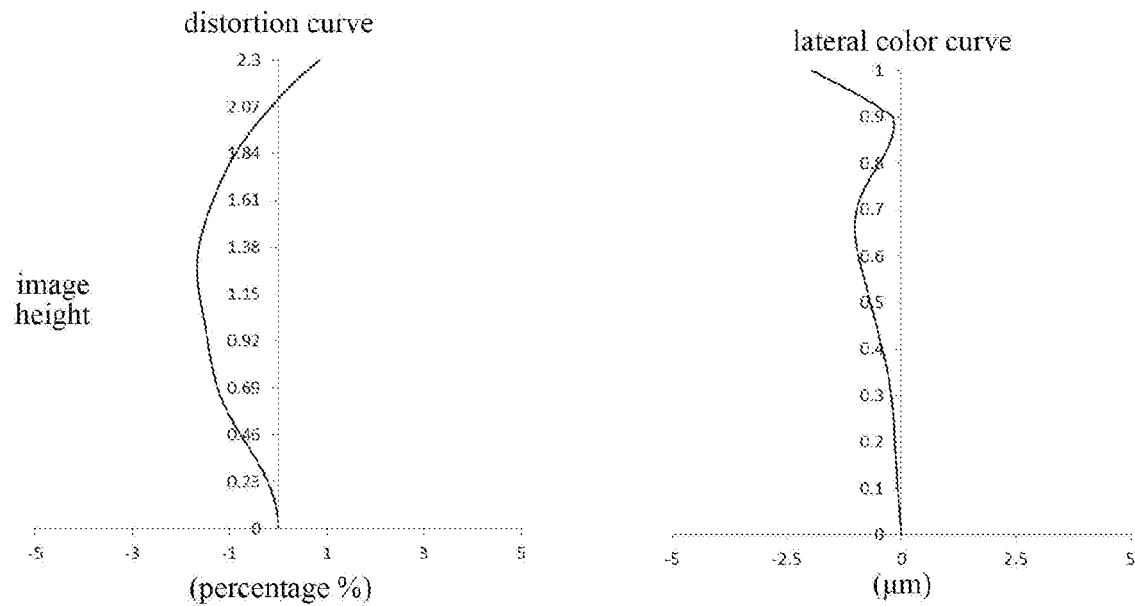
Fig. 14C
Fig. 14D
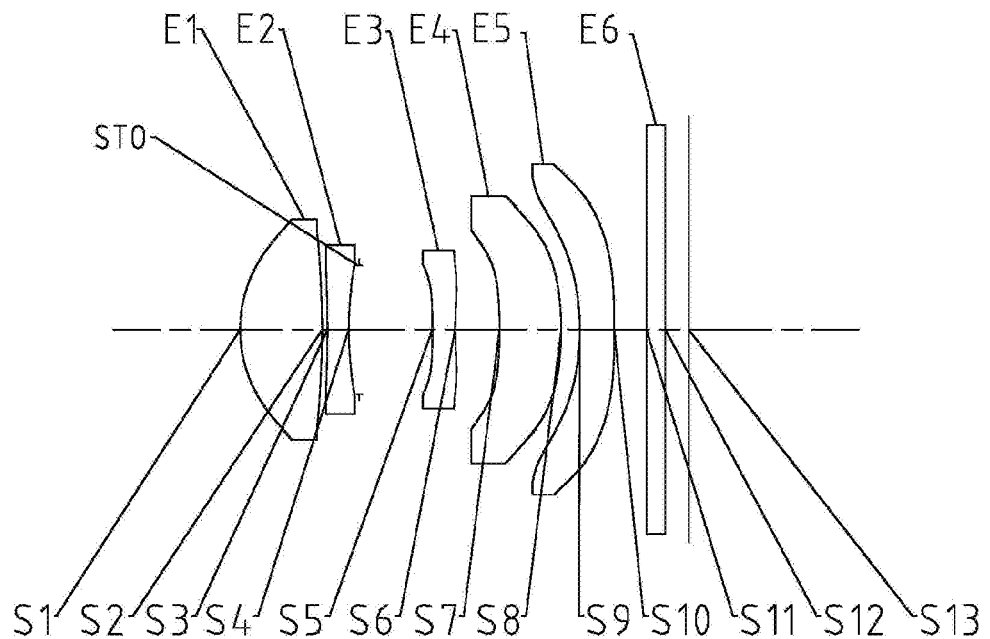
Fig. 15

IMAGING LENS ASSEMBLY

RELATED APPLICATIONS

The present application is a National Phase of International Application Number PCT/CN2017/107331, filed Oct. 23, 2017, and claims the priority of China Application No. 201710383984.X, filed May 26, 2017; and China Application No. 201720600009.5, filed May 26, 2017.

TECHNICAL FIELD

The present disclosure relates to an imaging lens assembly, and more specifically to an imaging lens assembly including five lenses.

BACKGROUND

As the science and technology develop, portable electronic products are gradually rising, and portable electronic products having camera functions are increasingly favored by people. For imaging lens assemblies in the portable electronic products, higher requirements on the image quality of the lens assemblies are brought forward on the basis of satisfying miniaturization.

The newly proposed dual camera concept may combine wide-angle and telephoto to achieve the purpose of zooming under the premise of ensuring lightness and thinness of the electronic products, so that the lens assembly may obtain a clearer image at a short distance or at a long distance, which makes a user obtain a different visual effect and a better user experience.

SUMMARY

According to an aspect, the present disclosure provides an imaging lens assembly. The imaging lens assembly includes, sequentially from an object side to an image side along an optical axis, a first lens, a second lens, a third lens, a fourth lens and a fifth lens. The first lens may have a positive refractive power, and an object-side surface of the first lens is a convex surface. The second lens may have a negative refractive power, and an object-side surface and an image-side surface of the second lens are concave surfaces. The third lens may have a negative refractive power. The fourth lens may have a positive refractive power or a negative refractive power. The fifth lens may have a positive refractive power or a negative refractive power, an object-side surface of the fifth lens is a concave surface, and an image-side surface of the fifth lens is a convex surface or a plane. An air spacing T23 between the second lens and the third lens on the optical axis and an air spacing T34 between the third lens and the fourth lens on the optical axis may satisfy: $1.0 \leq T23/T34 < 2.0$.

According to another aspect, the present disclosure provides an imaging lens assembly. The imaging lens assembly includes, sequentially from an object side to an image side along an optical axis, a first lens, a second lens, a third lens, a fourth lens and a fifth lens. The first lens may have a positive refractive power, and an object-side surface of the first lens is a convex surface. The second lens may have a negative refractive power, and an object-side surface and an image-side surface of the second lens are concave surfaces. The third lens may have a negative refractive power. The fourth lens may have a positive refractive power or a negative refractive power. The fifth lens may have a positive refractive power or a negative refractive power, an object-side surface of the fifth lens is a concave surface, and an image-side surface of the fifth lens is a convex surface or a plane. A combined focal length f12 of the first lens and the second lens and a combined focal length f45 of the fourth lens and the fifth lens may satisfy: $-1 \leq f12/f45 \leq 0$.

According to another aspect, the present disclosure provides an imaging lens assembly. The imaging lens assembly includes, sequentially from an object side to an image side along an optical axis, a first lens, a second lens, a third lens, a fourth lens and a fifth lens. The first lens may have a positive refractive power, and an object-side surface of the first lens is a convex surface. The second lens may have a negative refractive power, and an object-side surface and an image-side surface of the second lens are concave surfaces. The third lens may have a negative refractive power. The fourth lens may have a positive refractive power or a negative refractive power. The fifth lens may have a positive refractive power or a negative refractive power, an object-side surface of the fifth lens is a concave surface, and an image-side surface of the fifth lens is a convex surface or a plane. A focal length f1 of the first lens, a focal length f2 of the second lens and a focal length f5 of the fifth lens may satisfy: $0 \leq f1*f2/f5 \leq 6$.

In an implementation, half of a maximal field-of-view HFOV of the imaging lens assembly may satisfy: $HFOV \leq 25°$.

In an implementation, an axial distance TTL from the object-side surface of the first lens to an image plane of the imaging lens assembly and an effective focal length f of the imaging lens assembly may satisfy: $TTL/f \leq 1.0$.

In an implementation, the focal length f2 of the second lens and the focal length f1 of the first lens may satisfy: $-4 \leq f2/f1 \leq -1$.

In an implementation, the effective focal length f of the imaging lens assembly and a focal length f3 of the third lens may satisfy: $-1 \leq f/f3 \leq 0$.

In an implementation, the effective focal length f of the imaging lens assembly and the focal length f5 of the fifth lens may satisfy: $-1.5 \leq f/f5 \leq 0$.

In an implementation, the focal length f3 of the third lens and a focal length f4 of the fourth lens may satisfy: $-11 \leq (f3-f4)/(f3+f4) \leq 1$.

In an implementation, an abbe number V4 of the fourth lens and an abbe number V5 of the fifth lens may satisfy: $28 \leq |V4-V5|$.

In an implementation, a radius of curvature R1 of the object-side surface of the first lens and a radius of curvature R2 of an image-side surface of the first lens may satisfy: $-0.5 \leq R1/R2 \leq 0.2$.

In an implementation, the radius of curvature R1 of the object-side surface of the first lens and a radius of curvature R4 of the image-side surface of the second lens may satisfy: $-3 \leq (R1+R4)/(R1-R4) \leq -1$.

In the present disclosure, multiple lenses (e.g., five lenses) are used. By reasonably distributing the refractive powers and the surface types of the lenses in the imaging lens assembly, and the spacing distances between the lenses, the imaging lens assembly may possess at least one of the following beneficial effects:

achieving miniaturization of the lens assembly;
ensuring a telephoto characteristic of the lens assembly;
reducing sensitivity of the system;
facilitating processing and molding of the lens assembly;
correcting various aberrations; and improving resolution and an image quality of the lens assembly.

BRIEF DESCRIPTION OF THE DRAWINGS

After reading detailed descriptions of following non-limiting embodiments given with reference to the accompanying drawings, other features, objectives and advantages of the present disclosure will become more apparent. In the accompanying drawings:

FIGS. 6A-6D respectively illustrate a longitudinal aberration curve, an astigmatic curve, a distortion curve and a lateral color curve of the imaging lens assembly according to Embodiment 3;

FIG. 7 is a schematic structural diagram illustrating an imaging lens assembly according to Embodiment 4 of the present disclosure;

FIGS. 8A-8D respectively illustrate a longitudinal aberration curve, an astigmatic curve, a distortion curve and a lateral color curve of the imaging lens assembly according to Embodiment 4;

FIG. 9 is a schematic structural diagram illustrating an imaging lens assembly according to Embodiment 5 of the present disclosure;

FIGS. 10A-10D respectively illustrate a longitudinal aberration curve, an astigmatic curve, a distortion curve and a lateral color curve of the imaging lens assembly according to Embodiment 5;

FIGS. 14A-14D respectively illustrate a longitudinal aberration curve, an astigmatic curve, a distortion curve and a lateral color curve of the imaging lens assembly according to Embodiment 7;

FIG. 15 is a schematic structural diagram illustrating an imaging lens assembly according to Embodiment 8 of the present disclosure.

DETAILED DESCRIPTION OF EMBODIMENTS

Figure 1:
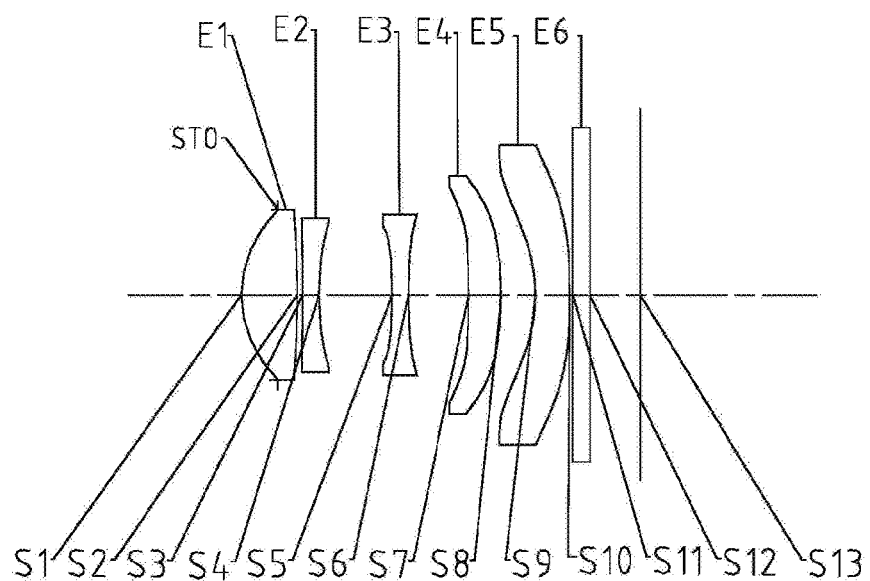
FIG. 1 is a schematic structural diagram illustrating an imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the present specification, the expressions, such as "first," "second" and "third" are only used to distinguish one feature from another, without indicating any limitation to the feature. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In the present disclosure, the surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, entireties, steps, operations, elements and/or components, but do not exclude the presence or addition of one or more other features, entireties, steps, operations, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Characteristics, principles and other aspects of the present disclosure will be described below in detail.

An imaging lens assembly according to exemplary implementations of the present disclosure has, for example, five lenses, i.e., a first lens, a second lens, a third lens, a fourth lens and a fifth lens. The five lenses are arranged in sequence from an object side to an image side along an optical axis.

According to the exemplary implementations of the present disclosure, the first lens may have a positive refractive power, and an object-side surface of the first lens is a convex surface. The second lens may have a negative refractive power, an object-side surface of the second lens is a concave surface, and an image-side surface of the second lens is a concave surface. The third lens may have a negative refractive power. The fourth lens may have a positive refractive power or a negative refractive power. The fifth lens may have a positive refractive power or a negative refractive power, an object-side surface of the fifth lens is a concave surface, and an image-side surface of the fifth lens is a convex surface or a plane.

In the exemplary implementations, half of a maximal field-of-view HFOV of the imaging lens assembly may satisfy: HFOV≤25°, and more specifically, HFOV may further satisfy: 22.2°≤HFOV≤23.9°.

In the application, distribution of refractive powers of the lenses may be reasonably optimized. A focal length f1 of the first lens and a focal length f2 of the second lens may satisfy: −4≤f2/f1≤−1, and more specifically, f1 and f2 may further satisfy: −3.29≤f2/f1≤−1.62. The reasonable distribution of the refractive powers may effectively correct a chromatic aberration of the lens assembly, and reduce a high-order spherical aberration of a telephoto lens assembly.

An effective focal length f of the imaging lens assembly and a focal length f3 of the third lens may satisfy: −1≤f/f3≤0, and more specifically, f and f3 may further satisfy: −0.95≤f/f3≤−0.01. The reasonable distribution of the refractive power of the third lens is conductive to correcting a high-order aberration of the lens assembly.

The effective focal length f of the imaging lens assembly and a focal length f5 of the fifth lens may satisfy: −1.5≤f/f5≤0, and more specifically, f and f5 may further satisfy: −1.43≤f/f5≤−0.27. The reasonable distribution of the refractive power of the fifth lens is conductive to miniaturization of the lens assembly. Meanwhile, the reasonable distribution of the refractive power of the fifth lens is also conductive to reducing an astigmatism of the system.

The focal length f3 of the third lens and a focal length f4 of the fourth lens may satisfy: −11≤(f3−f4)/(f3+f4)≤1, and more specifically, f3 and f4 may further satisfy: −10.92≤(f3−f4)/(f3+f4)≤0.69. By reasonably distributing the refractive powers of the third lens and the fourth lens, the high-order aberration of the lens assembly may be balanced.

The focal length f1 of the first lens, the focal length f2 of the second lens and the focal length f5 of the fifth lens may satisfy: 0≤f1*f2/f5≤6 mm, and more specifically, f1, f2 and f5 may further satisfy: 0.89 mm≤f1*f2/f5≤5.53 mm. By reasonably distributing the refractive powers of the first lens, the second lens and the fifth lens, a primary aberration and a high-order aberration of the system are balanced, which makes the lens assembly have a telephoto characteristic while the lens assemble is effectively miniaturized.

In the exemplary implementations, a combined focal length f12 of the first lens and the second lens and a combined focal length f45 of the fourth lens and the fifth lens may satisfy: −1≤f12/f45≤0, and more specifically, f12 and f45 may further satisfy: −0.70≤f12/f45≤−0.22. The combined focal length f12 and the combined focal length f45 are reasonably distributed to ensure the telephoto characteristic of the lens assembly to achieve a telephoto function of the lens assembly. Meanwhile, the reasonable distribution of the combined focal length f12 and the combined focal length f45 may also make the lens assembly have a small depth of field and a larger magnifying power.

The imaging lens assembly according to the exemplary implementations of the present disclosure may maintain the miniaturization of the lens assembly while satisfying the telephoto characteristic of the lens assembly. Specifically, an axial distance TTL from the object-side surface of the first lens to an image plane of the imaging lens assembly and the effective focal length f of the imaging lens assembly satisfy: TTL/f≤1.0, and more specifically, TTL and f may further satisfy: 0.88≤TTL/f≤0.94.

In addition, radii of curvature of the mirror surfaces may also be reasonably arranged. For example, a radius of curvature R1 of the object-side surface of the first lens and a radius of curvature R2 of an image-side surface of the first lens may satisfy: −0.5≤R1/R2≤0.2, and more specifically, R1 and R2 may further satisfy: −0.40≤R1/R2≤0.11. The reasonable restriction to the shape of the first lens may facilitate processing and molding of the lens assembly, meanwhile, also facilitate the achieving of the miniaturization of the lens assembly.

The radius of curvature R1 of the object-side surface of the first lens and a radius of curvature R4 of the image-side surface of the second lens may satisfy: −3≤(R1+R4)/(R1−R4)≤−1, and more specifically, R1 and R4 may further satisfy: −2.97≤(R1+R4)/(R1−R4)≤−1.26. The radius of curvature R1 of the object-side surface of the first lens and the radius of curvature R4 of the image-side surface of the second lens are reasonably arranged, which is conductive to balancing a high-order spherical aberration and a high-order astigmatism of the system and reducing sensitivity of the system.

In the exemplary implementations, an abbe number V4 of the fourth lens and an abbe number V5 of the fifth lens may satisfy: 28≤|V4−V5|, and more specifically, V4 and V5 may further satisfy: |V4−V5|=35.70. When the abbe number V4 of the fourth lens and the abbe number V5 of the fifth lens satisfy 28≤|V4−V5|, it is conductive to correcting a chromatic aberration of the system and balancing a high-order aberration, thereby improving an image quality of the lens assembly.

Alternatively, the imaging lens assembly according to the present disclosure may also include an optical filter for correcting a color deviation. The optical filter may be disposed, for example, between the fifth lens and the image plane. It should be understood by those skilled in the art that the optical filter may be disposed at other positions as required.

The imaging lens assembly according to the above implementations of the present disclosure may use multiple lenses, for example, five lenses as described above. By reasonably distributing the refractive powers and the surface types of the lenses, the axial spacing distances between the lenses, etc., it is possible to ensure the telephoto characteristic of the lens assembly, reduce the sensitivity of the system, ensure the miniaturization of the lens assembly, and improve the image quality, thus making the imaging lens assembly more conductive to the production and processing and applicable to the portable electronic products. In the implementations of the present disclosure, at least one of the mirror surfaces of the lenses is an aspheric mirror surface. The aspheric lens is characterized in that its curvature continuously changes from the center of the lens to the periphery. In contrast to a spherical lens having a constant curvature from the center of the lens to the periphery, the aspheric lens has a better radius-of-curvature characteristic, and has advantages of improving a distortion aberration and an astigmatic aberration. The use of the aspheric lens can eliminate as much as possible the aberrations that occur during the imaging, thereby improving the image quality of the lens assembly.

However, it should be understood by those skilled in the art that the various results and advantages described in the present specification may be obtained by changing the number of the lenses forming the lens assembly without departing from the technical solution claimed by the present disclosure. For example, although the five lenses are described as an example in the implementations, the imaging lens assembly is not limited to include five lenses. If desired, the imaging lens assembly may also include other numbers of lenses.

Specific embodiments of the imaging lens assembly that may be applied to the above implementations are further described below with reference to the accompanying drawings.

Embodiment 1

An imaging lens assembly according to Embodiment 1 of the present disclosure is described below with reference to FIGS. 1-2D. FIG. 1 is a schematic structural diagram illustrating the imaging lens assembly according to Embodiment 1 of the present disclosure.

As shown in FIG. 1, the imaging lens assembly includes, along an optical axis, five lenses E1-E5 arranged in sequence from an object side to an image side. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10. Alternatively, the imaging lens assembly may further include an optical filter E6 having an object-side surface S11 and an image-side surface S12. In the imaging lens assembly of this embodiment, a diaphragm STO for limiting light beams may also be disposed, for example, between the object side and the first lens E1, to improve the image quality. Light from an object sequentially passes through the surfaces S1-S12 and finally forms an image on an image plane S13.

Table 1 shows the surface type, the radius of curvature, the thickness, the material and the conic coefficient of each lens of the imaging lens assembly in Embodiment 1. The radius of curvature and the thickness are shown in millimeters (mm).

TABLE 1

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.4461 | | | |
| S1 | aspheric | 1.4329 | 0.6889 | 1.546 | 56.11 | −0.9090 |
| S2 | aspheric | −14.3853 | 0.0689 | | | −26.0563 |
| S3 | aspheric | −44.8622 | 0.2000 | 1.666 | 20.41 | −96.8496 |
| S4 | aspheric | 3.7236 | 0.9078 | | | 0.9038 |
| S5 | aspheric | −8.8827 | 0.2000 | 1.546 | 56.11 | 89.3317 |
| S6 | aspheric | 6.9290 | 0.7513 | | | 36.9521 |
| S7 | aspheric | −20.8201 | 0.4016 | 1.666 | 20.41 | 99.0000 |
| S8 | aspheric | −4.5035 | 0.4246 | | | 3.2800 |
| S9 | aspheric | −2.0922 | 0.4223 | 1.546 | 56.11 | −0.1227 |
| S10 | aspheric | −93.4964 | 0.0423 | | | 99.0000 |
| S11 | spherical | infinite | 0.2100 | 1.517 | 64.17 | |
| S12 | spherical | infinite | 0.6237 | | | |
| S13 | spherical | infinite | | | | |

As may be obtained from Table 1, the radius of curvature R1 of the object-side surface S1 of the first lens E1 and the radius of curvature R2 of the image-side surface S2 of the first lens E1 satisfy: R1/R2=−0.10. The radius of curvature R1 of the object-side surface S1 of the first lens E1 and the radius of curvature R4 of the image-side surface S4 of the second lens E2 satisfy: (R1+R4)/(R1−R4)=−2.25. The abbe number V4 of the fourth lens E4 and the abbe number V5 of the fifth lens E5 satisfy: |V4−V5|=35.70. The air spacing T23 between the second lens E2 and the third lens E3 on the optical axis and the air spacing T34 between the third lens E3 and the fourth lens E4 on the optical axis satisfy: T23/T34=1.21.

In this embodiment, five lenses are used as an example. By reasonably distributing the focal length and the surface type of each lens, and the spacings between the lenses, a wide-angle lens assembly is combined with a telephoto lens assembly while the miniaturization of the lens assembly is ensured, to achieve the purpose of zooming. The surface type x of each aspheric surface is defined by the following formula:

$$x = \frac{ch^2}{1+\sqrt{1-(k+1)c^2h^2}} + \sum A_i h^i. \quad (1)$$

Here, x is the distance sagittal height to the vertex of the aspheric surface when the aspheric surface is at a position of a height h along the optical axis; c is the paraxial curvature of the aspheric surface, and c=1/R (i.e., the paraxial curvature c is the reciprocal of the radius of curvature R in Table 1 above); k is the conic coefficient (given in Table 1 above); and $A_i$ is the correction coefficient of the $i^{th}$ order of the aspheric surface. Table 2 below shows the high-order coefficients $A_4$, $A_6$, $A_8$, $A_{10}$, $A_{12}$, $A_{14}$, $A_{16}$ and $A_{18}$ applicable to the aspheric mirror surfaces S1-S10 in Embodiment 1.

TABLE 2

| surface number | A4 | A6 | A8 | A10 | A12 | A14 | A16 | A18 |
|---|---|---|---|---|---|---|---|---|
| S1 | 3.5600E−02 | 2.6012E−03 | 4.6500E−02 | −1.6240E−01 | 3.4090E−01 | 4.0850E−01 | 2.5830E−01 | −6.8200E−02 |
| S2 | 7.5536E−03 | −8.9100E−02 | 4.4440E−01 | −1.2267E+00 | 1.9560E+00 | 4.8087E+00 | 9.0420E−01 | 4.9140E−01 |
| S3 | −1.6660E−04 | −1.4510E−01 | 8.6700E−01 | −2.6942E+00 | 4.8760E+00 | −5.0892E+00 | 2.8505E+00 | −6.6490E−01 |
| S4 | 1.0700E−02 | −1.0380E−01 | 7.1790E−01 | −2.5050E+00 | 5.1778E+00 | −6.1968E+00 | 3.9910E+00 | 4.0784E+00 |
| S5 | −3.4500E−02 | −2.8420E−01 | 1.7139E+00 | −6.8422E+00 | 1.6812E+01 | −2.5282E+01 | 2.1028E+01 | −74561E+00 |
| S6 | −3.6890E−03 | −2.3400E−02 | 8.8700E−02 | 9.0900E−02 | −5.9980E−01 | 9.1080E−01 | −6.0440E−01 | 1.4290E−01 |
| S7 | −8.9030E−03 | −1.8640E−01 | 3.8060E−01 | −5.7860E−01 | 5.6240E−01 | −3.1810E−01 | 9.6500E−02 | 4.2200E−02 |
| S8 | 4.1000E−02 | −2.2380E−01 | 4.0050E−01 | 4.9000E−01 | 3.7670E−01 | 4.7030E−01 | 4.1400E−02 | 4.1950E−03 |
| S9 | −4.3700E−02 | 8.1500E−02 | −1.0400E−02 | −3.9500E−02 | 3.7500E−02 | 4.5500E−02 | 3.1998E−03 | −2.6710E−04 |
| S10 | −1.8840E−01 | 2.1320E−01 | −1.7170E−01 | 9.2400E−02 | −3.2000E−02 | 6.5775E−03 | −6.7700E−04 | 2.2985E−05 |

Table 3 shows the focal lengths f1-f5 of the lenses, the effective focal length f of the imaging lens assembly, the axial distance TTL from the object-side surface S1 of the first lens E1 to the image plane S13, and the half of the diagonal length ImgH of the effective pixel area on the image plane S13 in Embodiment 1.

TABLE 3

| f1(mm) | 2.42 | f(mm) | 5.59 |
|---|---|---|---|
| f2(mm) | −5.15 | TTL(mm) | 4.94 |
| f3(mm) | −7.10 | ImgH(mm) | 2.30 |
| f4(mm) | 8.54 | | |
| f5(mm) | −3.93 | | |

As may be seen from Table 3, the axial distance TTL from the object-side surface S1 of the first lens E1 to the image plane S13 and the effective focal length f of the imaging lens assembly satisfy: TTL/f=0.88. The focal length f2 of the second lens E2 and the focal length f1 of the first lens E1 satisfy: f2/f1=−2.12. The effective focal length f of the imaging lens assembly and the focal length f3 of the third lens E3 satisfy: f/f3=−0.79. The focal length f1 of the first lens E1, the focal length f2 of the second lens E2 and the focal length f5 of the fifth lens E5 satisfy: f1*f2/f5=3.18 mm. The effective focal length f of the imaging lens assembly and the focal length f5 of the fifth lens E5 satisfy: f/f5=−1.43. The focal length f3 of the third lens E3 and the focal length f4 of the fourth lens E4 satisfy: (f3−f4)/(f3+f4)=−10.92. In addition, the combined focal length f12 of the first lens E1 and the second lens E2 and the combined focal length f45 of the fourth lens E4 and the fifth lens E5 satisfy: f12/f45=−0.48.

In this embodiment, the half of the maximal field-of-view HFOV of the imaging lens assembly satisfies: HFOV=22.2°.

Figures 2A, 2B:
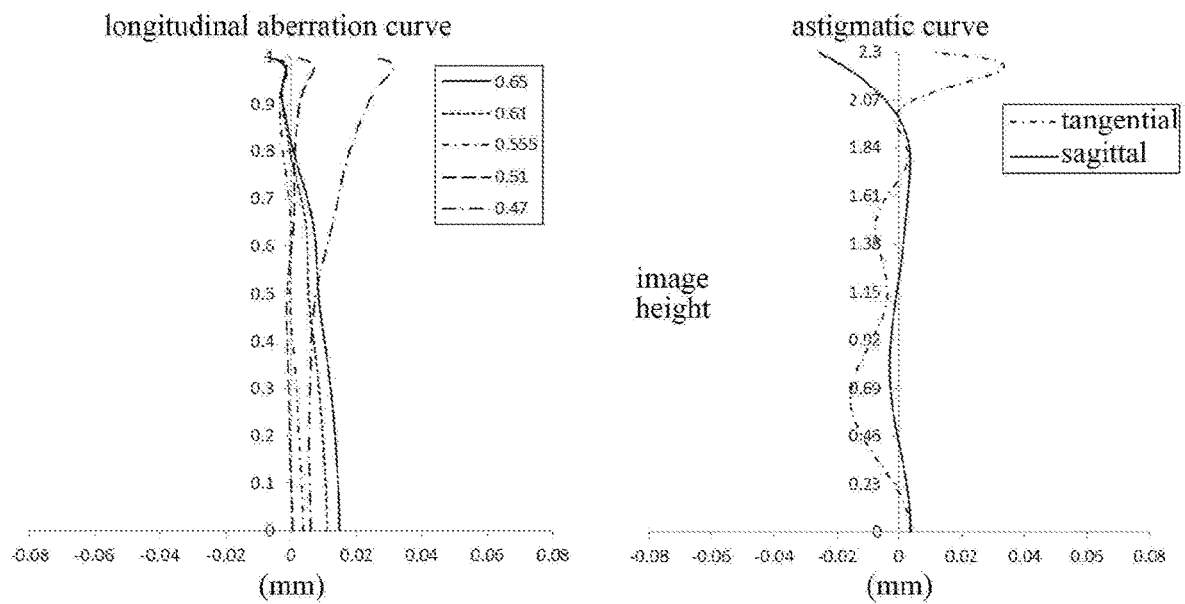
FIGS. 2A-2D respectively illustrate a longitudinal aberration curve, an astigmatic curve, a distortion curve and a lateral color curve of the imaging lens assembly according to Embodiment 1.
Figures 2C, 2D:
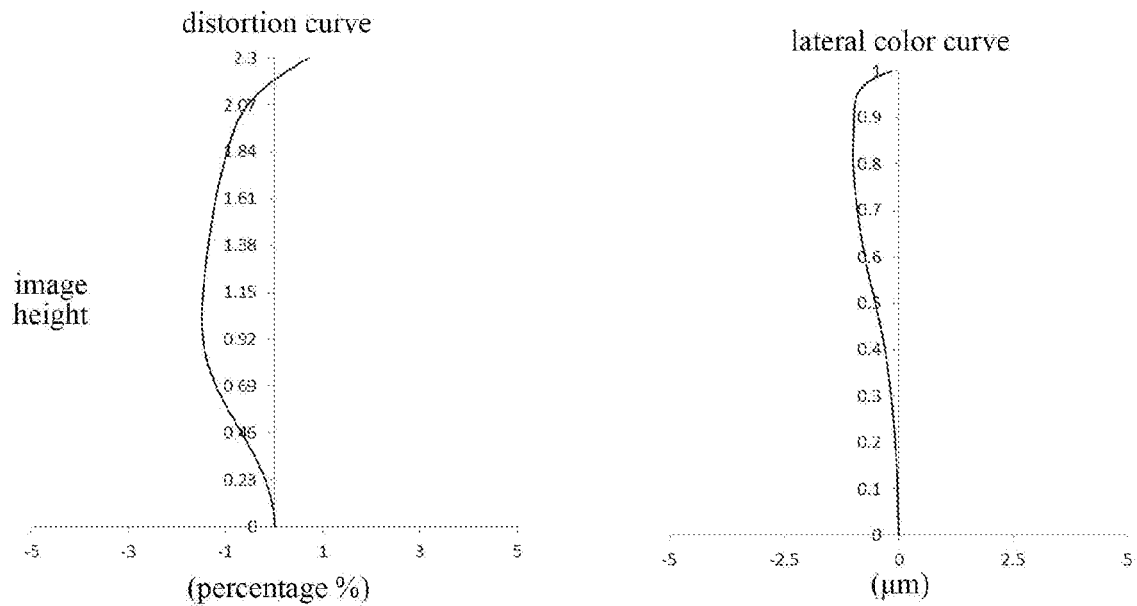

FIG. 2A illustrates a longitudinal aberration curve of the imaging lens assembly according to Embodiment 1, representing deviations of focal points of light of different wavelengths converged after passing through an imaging lens assembly. FIG. 2B illustrates anastigmatic curve of the imaging lens assembly according to Embodiment 1, representing a curvature of a tangential image plane and a curvature of a sagittal image plane. FIG. 2C illustrates a distortion curve of the imaging lens assembly according to Embodiment 1, representing amounts of distortion at different viewing angles. FIG. 2D illustrates a lateral color curve of the imaging lens assembly according to Embodiment 1, representing deviations of different image heights on an image plane after light passes through the imaging lens assembly. It can be seen from FIGS. 2A-2D that the imaging lens assembly according to Embodiment 1 can achieve a good image quality.

Embodiment 2

Figure 3:
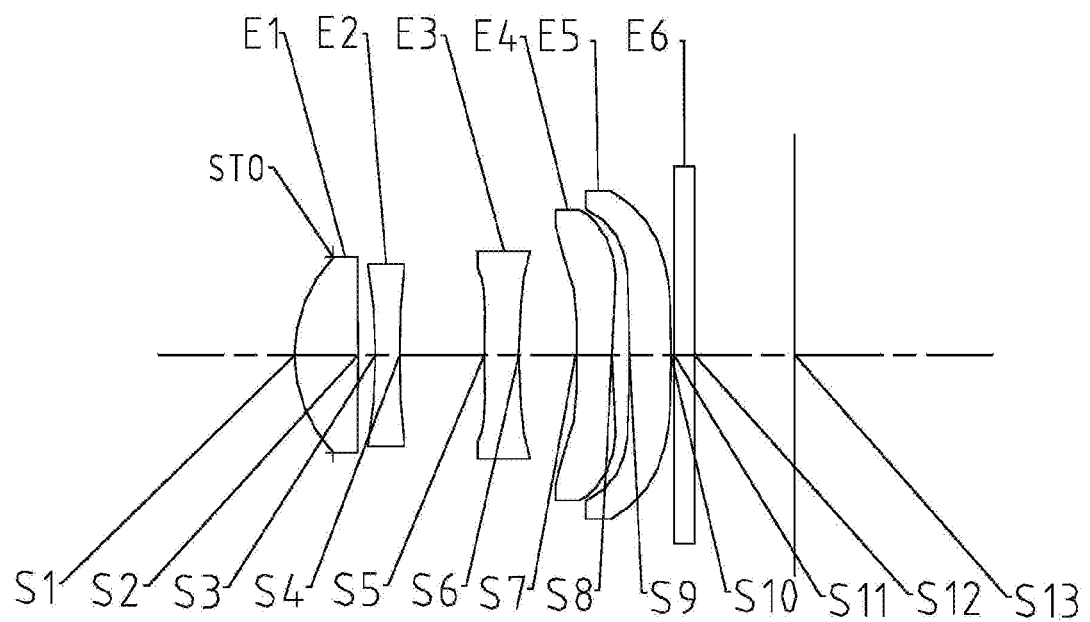
FIG. 3 is a schematic structural diagram illustrating an imaging lens assembly according to Embodiment 2 of the present disclosure.

An imaging lens assembly according to Embodiment 2 of the present disclosure is described below with reference to FIGS. 3-4D. In this embodiment and the following embodiments, for the purpose of brevity, the description of parts similar to those in Embodiment 1 will be omitted. FIG. 3 is a schematic structural diagram illustrating the imaging lens assembly according to Embodiment 2 of the present disclosure.

As shown in FIG. 3, the imaging lens assembly includes, along an optical axis, five lenses E1-E5 arranged in sequence from an object side to an image side. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10. Alternatively, the imaging lens assembly may further include an optical filter E6 having an object-side surface S11 and an image-side surface S12. In the imaging lens assembly of this embodiment, a diaphragm STO for limiting light beams may also be disposed, for example, between the object side and the first lens E1, to improve the image quality. Light from an object sequentially passes through the surfaces S1-S12 and finally forms an image on an image plane S13.

Table 4 shows the surface type, the radius of curvature, the thickness, the material and the conic coefficient of each lens of the imaging lens assembly in Embodiment 2. The radius of curvature and the thickness are shown in millimeters (mm). Table 5 shows the high-order coefficients of each aspheric mirror surface in Embodiment 2. Table 6 shows the focal lengths f1-f5 of the lenses, the effective focal length f of the imaging lens assembly, the axial distance TTL from the object-side surface S1 of the first lens E1 to the image plane S13, and the half of the diagonal length ImgH of the effective pixel area on the image plane S13 in Embodiment 2. Here, the surface type of each aspheric surface may be defined by the formula (1) given in Embodiment 1.

TABLE 4

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3904 | | | |
| S1 | aspheric | 1.4626 | 0.6513 | 1.546 | 56.11 | −1.0179 |
| S2 | aspheric | 29.7850 | 0.1769 | | | −13.8097 |
| S3 | aspheric | −6.5233 | 0.2500 | 1.666 | 20.41 | 34.2296 |
| S4 | aspheric | 12.9149 | 0.8647 | | | −25.3234 |
| S5 | aspheric | 9.6370 | 0.3520 | 1.546 | 56.11 | −23.8512 |
| S6 | aspheric | 4.1419 | 0.5914 | | | −27.9493 |
| S7 | aspheric | 40.3700 | 0.3640 | 1.546 | 56.11 | 39.6109 |
| S8 | aspheric | 7.4313 | 0.1816 | | | −22.6831 |
| S9 | aspheric | −13.4467 | 0.4223 | 1.666 | 20.41 | 0.1163 |
| S10 | aspheric | −1132.5420 | 0.0300 | | | −99.0000 |
| S11 | spherical | infinite | 0.2100 | 1.517 | 64.17 | |
| S12 | spherical | infinite | 1.0276 | | | |
| S13 | spherical | infinite | | | | |

TABLE 5

| surface number | A4 | A6 | A8 | A10 | A12 | A14 | A16 | A18 |
|---|---|---|---|---|---|---|---|---|
| S1 | −2.2800E−02 | 2.1490E−01 | −7.2780E−01 | 1.4601E+00 | −.6958E+00 | 1.0647E+00 | −2.8110E−01 | 4.0500E−02 |
| S2 | 7.5536E−03 | −8.9100E−02 | 4.4440E−01 | −1.2267E+00 | 1.9560E+00 | −1.8087E+00 | 9.0420E−01 | −1.9140E−01 |
| S3 | −1.6660E−04 | −1.4510E−01 | 8.6700E−01 | −2.6942E+00 | 4.8760E+00 | −5.0892E+00 | 2.8505E+00 | −6.6490E−01 |
| S4 | 1.0700E−02 | −1.0380E−01 | 7.1790E−01 | −2.5050E+00 | 5.1778E+00 | −6.1968E+00 | 3.9910E+00 | −1.0784E+00 |
| S5 | −3.4500E−02 | −2.8420E−01 | 1.7139E+00 | −6.8422E+00 | 1.6812E+01 | −2.5282E+01 | 2.1028E+01 | −7.4561E+00 |
| S6 | −3.6890E−03 | −2.3400E−02 | 8.8700E−02 | 9.0900E−02 | −5.9980E−01 | 9.1080E−01 | −6.0440E−01 | 1.4290E−01 |
| S7 | −8.9030E−03 | −1.8640E−01 | 3.8060E−01 | −5.7860E−01 | 5.6240E−01 | −3.1810E−01 | 9.6500E−02 | −1.2200E−02 |
| S8 | 4.1000E−02 | −2.2380E−01 | 4.0050E−01 | 4.9000E−01 | 3.7670E−01 | −1.7030E−01 | 4.1400E−02 | 4.1950E−03 |
| S9 | −4.3700E−02 | 8.1500E−02 | −1.0400E−02 | −3.9500E−02 | 3.7500E−02 | −1.5500E−02 | 3.1998E−03 | −2.6710E−04 |
| S10 | −1.8840E−01 | 2.1320E−01 | −1.7170E−01 | 9.2400E−02 | −3.2000E−02 | 6.5775E−03 | −6.7700E−04 | 2.2985E−05 |

TABLE 6

| f1(mm) | 2.79 | f(mm) | 5.60 |
|---|---|---|---|
| f2(mm) | −6.47 | TTL(mm) | 5.12 |
| f3(mm) | −13.61 | ImgH(mm) | 2.26 |
| f4(mm) | −16.75 | | |
| f5(mm) | −20.42 | | |

Figure 4A:
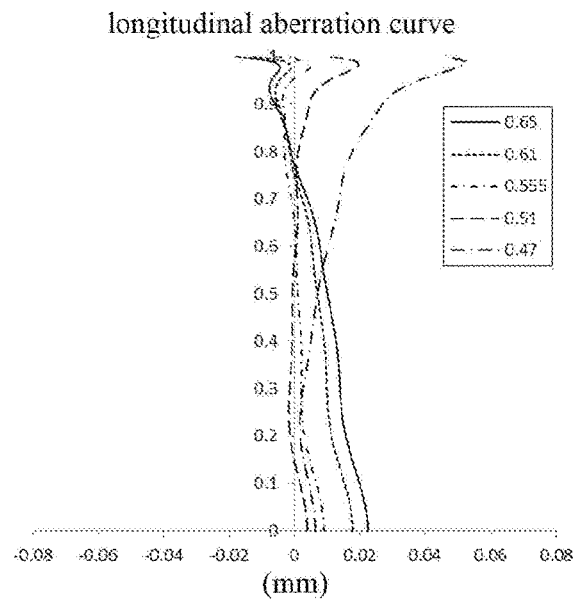
FIGS. 4A-4D respectively illustrate a longitudinal aberration curve, an astigmatic curve, a distortion curve and a lateral color curve of the imaging lens assembly according to Embodiment 2.
Figure 4B:
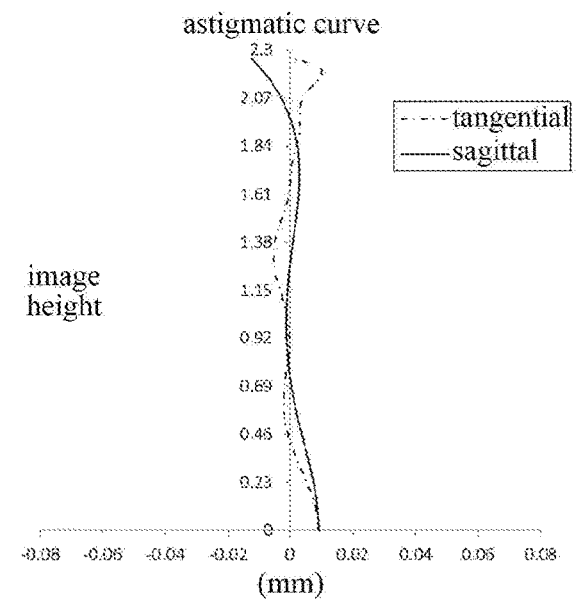
Figure 4C:
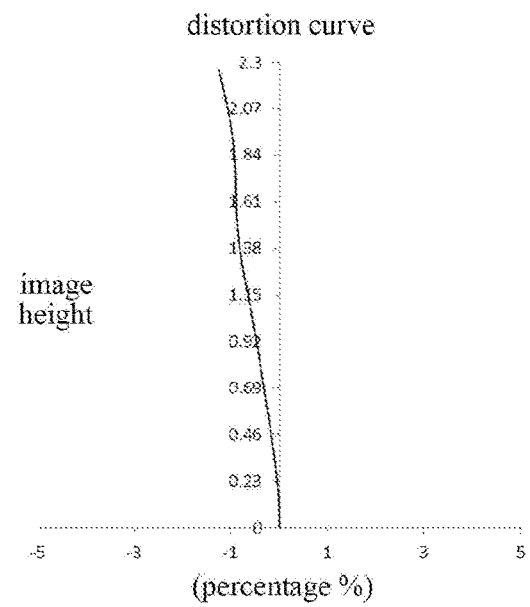
Figure 4D:
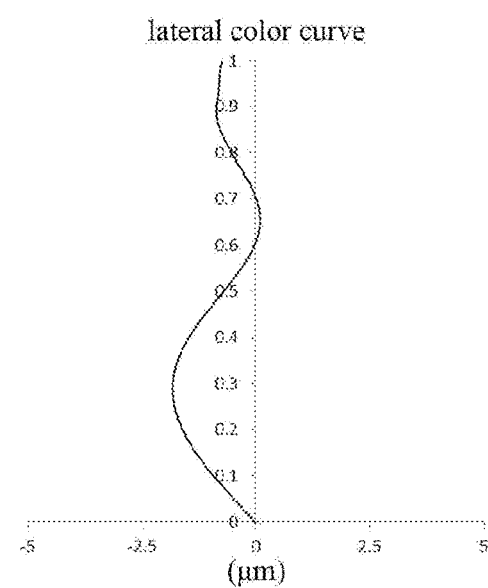

FIG. 4A illustrates a longitudinal aberration curve of the imaging lens assembly according to Embodiment 2, representing deviations of focal points of light of different wavelengths converged after passing through an imaging lens assembly. FIG. 4B illustrates anastigmatic curve of the imaging lens assembly according to Embodiment 2, representing a curvature of a tangential image plane and a curvature of a sagittal image plane. FIG. 4C illustrates a distortion curve of the imaging lens assembly according to Embodiment 2, representing amounts of distortion at different viewing angles. FIG. 4D illustrates a lateral color curve of the imaging lens assembly according to Embodiment 2, representing deviations of different image heights on an image plane after light passes through the imaging lens assembly. It can be seen from FIGS. 4A-4D that the imaging lens assembly according to Embodiment 2 can achieve a good image quality.

Embodiment 3

Figure 5:
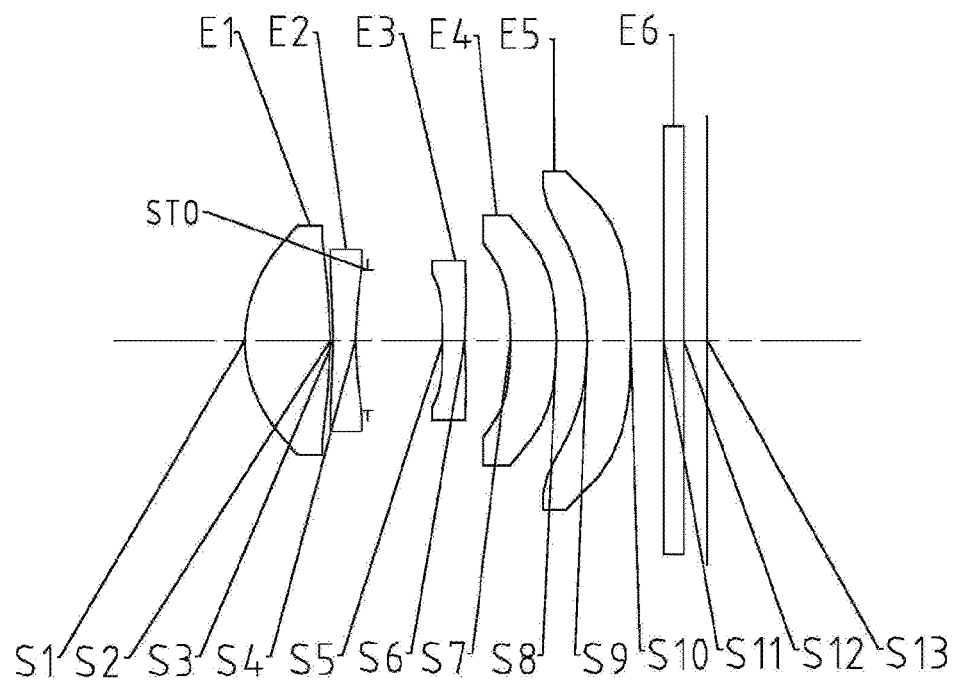
FIG. 5 is a schematic structural diagram illustrating an imaging lens assembly according to Embodiment 3 of the present disclosure.

An imaging lens assembly according to Embodiment 3 of the present disclosure is described below with reference to FIGS. 5-6D. FIG. 5 is a schematic structural diagram illustrating the imaging lens assembly according to Embodiment 3 of the present disclosure.

As shown in FIG. 5, the imaging lens assembly includes, along an optical axis, five lenses E1-E5 arranged in sequence from an object side to an image side. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10. Alternatively, the imaging lens assembly may further include an optical filter E6 having an object-side surface S11 and an image-side surface S12. In the imaging lens assembly of this embodiment, a diaphragm STO for limiting light beams may also be disposed, for example, between the second lens E2 and the third lens E3, to improve the image quality. Light from an object sequentially passes through the surfaces S1-S12 and finally forms an image on an image plane S13.

Table 7 shows the surface type, the radius of curvature, the thickness, the material and the conic coefficient of each lens of the imaging lens assembly in Embodiment 3. The radius of curvature and the thickness are shown in millimeters (mm). Table 8 shows the high-order coefficients of each aspheric mirror surface in Embodiment 3. Table 9 shows the focal lengths f1-f5 of the lenses, the effective focal length f of the imaging lens assembly, the axial distance TTL from the object-side surface S1 of the first lens E1 to the image plane 513, and the half of the diagonal length ImgH of the effective pixel area on the image plane S13 in Embodiment 3. Here, the surface type of each aspheric surface may be defined by the formula (1) given in Embodiment 1.

ent viewing angles. FIG. 6D illustrates a lateral color curve of the imaging lens assembly according to Embodiment 3, representing deviations of different image heights on an

TABLE 7

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.5175 | 0.9164 | 1.546 | 56.11 | −0.5586 |
| S2 | aspheric | −3.7931 | 0.0324 | | | −63.8779 |
| S3 | aspheric | −11.1162 | 0.2350 | 1.666 | 20.41 | 13.5275 |
| S4 | aspheric | 3.1362 | 0.1294 | | | −22.9991 |
| STO | spherical | infinite | 0.8023 | | | 0.0000 |
| S5 | aspheric | −48.7511 | 0.2350 | 1.546 | 56.11 | −94.4854 |
| S6 | aspheric | 3.3101 | 0.4949 | | | −43.5357 |
| S7 | aspheric | −5.7621 | 0.4954 | 1.666 | 20.41 | 15.4631 |
| S8 | aspheric | −3.8242 | 0.3282 | | | −6.7984 |
| S9 | aspheric | −3.7906 | 0.4591 | 1.546 | 56.11 | −11.1457 |
| S10 | spherical | −65.5878 | 0.3551 | | | 89.0690 |
| S11 | spherical | infinite | 0.2127 | 1.517 | 64.17 | |
| S12 | spherical | infinite | 0.2543 | | | |
| S13 | spherical | infinite | | | | |

TABLE 8

| surface number | A4 | A6 | A8 | A10 | A12 |
|---|---|---|---|---|---|
| S1 | 1.6413E−02 | −7.1098E−03 | 4.9867E−02 | −1.4407E−01 | 2.5274E−01 |
| S2 | 2.0415E−02 | −1.4457E−01 | 5.8614E−01 | −1.2963E+00 | 1.7518E+00 |
| S3 | 1.1783E−02 | −2.2414E−01 | 9.3574E−01 | −1.8655E+00 | 2.0681E+00 |
| S4 | −7.0200E−02 | 1.8040E−01 | −1.1189E+00 | 6.2346E+00 | −2.0284E+01 |
| S5 | 4.6825E−01 | −4.7055E−01 | 8.1064E+00 | −5.3289E+01 | 2.1570E+02 |
| S6 | −2.9235E−01 | −9.3267E−04 | 1.6951E+00 | −8.1277E+00 | 2.4742E+01 |
| S7 | −1.1347E−01 | −1.3992E−01 | 3.1407E−01 | −8.1257E−01 | 1.2098E+00 |
| S8 | −6.7118E−02 | −2.1774E−01 | 7.4704E−01 | −1.5054E+00 | 1.8428E+00 |
| S9 | −1.0773E−01 | −2.4198E−01 | 9.0784E−01 | −1.2717E+00 | 9.4986E−01 |
| S10 | −1.2600E−01 | −3.5839E−02 | 1.7777E−01 | −1.6847E−01 | 6.9866E−02 |

| surface number | A14 | A16 | A18 | A20 |
|---|---|---|---|---|
| S1 | −2.7675E−01 | 1.8306E−01 | −6.7468E−02 | 1.0457E−02 |
| S2 | −1.4944E+00 | 7.8119E−01 | −2.2760E−01 | 2.8240E−02 |
| S3 | −1.1038E+00 | 8.1496E−03 | 2.6523E−01 | −8.5260E−02 |
| S4 | 3.9070E+01 | 4.4112E+01 | 2.6922E+01 | −6.8324E+00 |
| S5 | −5.4754E+02 | 8.4835E+02 | −7.3222E+02 | 2.6905E+02 |
| S6 | 4.6733E+01 | 5.3730E+01 | −3.4262E+01 | 9.2031E+00 |
| S7 | −1.2427E+00 | 1.0250E+00 | 4.5845E−01 | 5.9978E−02 |
| S8 | −1.4618E+00 | 7.3984E−01 | −2.1132E−01 | 2.5195E−02 |
| S9 | −4.0820E−01 | 1.0119E−01 | −1.3405E−02 | 7.2806E−04 |
| S10 | −9.0549E−03 | −2.8798E−03 | 1.1489E−03 | −1.1506E−04 |

TABLE 9

| f1(mm) | 2.11 | f(mm) | 5.40 |
|---|---|---|---|
| f2(mm) | −4.71 | TTL(mm) | 4.95 |
| f3(mm) | −5.67 | ImgH(mm) | 2.40 |
| f4(mm) | 15.48 | | |
| f5(mm) | −7.39 | | |

Figures 6A, 6B:
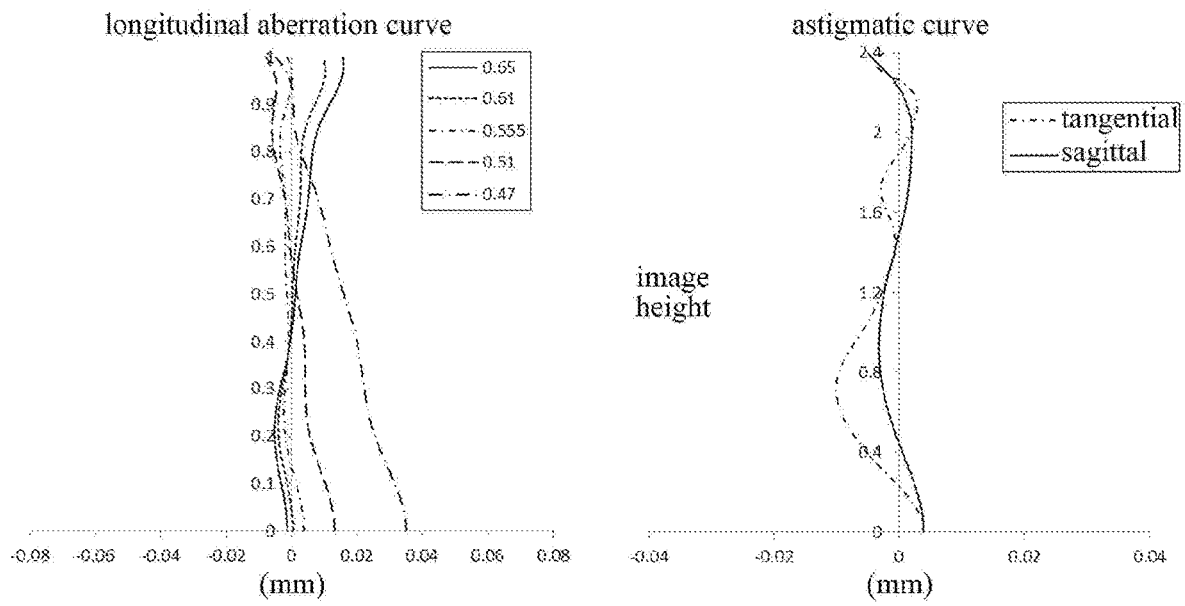

FIG. 6A illustrates a longitudinal aberration curve of the imaging lens assembly according to Embodiment 3, representing deviations of focal points of light of different wavelengths converged after passing through an imaging lens assembly. FIG. 6B illustrates anastigmatic curve of the imaging lens assembly according to Embodiment 3, representing a curvature of a tangential image plane and a curvature of a sagittal image plane. FIG. 6C illustrates a distortion curve of the imaging lens assembly according to Embodiment 3, representing amounts of distortion at different viewing angles.

image plane after light passes through the imaging lens assembly. It can be seen from FIGS. 6A-6D that the imaging lens assembly according to Embodiment 3 can achieve a good image quality.

Embodiment 4

An imaging lens assembly according to Embodiment 4 of the present disclosure is described below with reference to FIGS. 7-8D. FIG. 7 is a schematic structural diagram illustrating the imaging lens assembly according to Embodiment 4 of the present disclosure.

As shown in FIG. 7, the imaging lens assembly includes, along an optical axis, five lenses E1-E5 arranged in sequence from an object side to an image side. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10. Alternatively, the imaging lens assembly may further include an optical filter E6 having an object-side surface S11 and an image-side surface S12. In the imaging lens assembly of this embodiment, a diaphragm STO for limiting light beams may also be disposed, for example, between the object side and the first lens E1, to improve the image quality. Light from an object sequentially passes through the surfaces S1-S12 and finally forms an image on an image plane S13.

Table 10 shows the surface type, the radius of curvature, the thickness, the material and the conic coefficient of each lens of the imaging lens assembly in Embodiment 4. The radius of curvature and the thickness are shown in millimeters (mm). Table 11 shows the high-order coefficients of each aspheric mirror surface in Embodiment 4. Table 12 shows the focal lengths f1-f5 of the lenses, the effective focal length f of the imaging lens assembly, the axial distance TTL from the object-side surface S1 of the first lens E1 to the image plane S13, and the half of the diagonal length ImgH of the effective pixel area on the image plane S13 in Embodiment 4. Here, the surface type of each aspheric surface may be defined by the formula (1) given in Embodiment 1.

TABLE 12

| f1(mm) | 2.89 | f(mm) | 5.60 |
|---|---|---|---|
| f2(mm) | −4.69 | TTL(mm) | 5.00 |
| f3(mm) | −687.47 | ImgH(mm) | 2.26 |
| f4(mm) | −126.95 | | |
| f5(mm) | −7.17 | | |

FIG. 8A illustrates a longitudinal aberration curve of the imaging lens assembly according to Embodiment 4, representing deviations of focal points of light of different wavelengths converged after passing through an imaging lens assembly. FIG. 8B illustrates anastigmatic curve of the imaging lens assembly according to Embodiment 4, representing a curvature of a tangential image plane and a curvature of a sagittal image plane. FIG. 8C illustrates a distortion curve of the imaging lens assembly according to Embodiment 4, representing amounts of distortion at different viewing angles. FIG. 8D illustrates a lateral color curve of the imaging lens assembly according to Embodiment 4, representing deviations of different image heights on an image plane after light passes through the imaging lens assembly. It can be seen from FIGS. 8A-8D that the imaging lens assembly according to Embodiment 4 can achieve a good image quality.

TABLE 10

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.3789 | | | |
| S1 | aspheric | 1.4466 | 0.9778 | 1.546 | 56.11 | −1.1634 |
| S2 | aspheric | 13.3379 | 0.1788 | | | −13.8097 |
| S3 | aspheric | −38.1311 | 0.2839 | 1.666 | 20.41 | −17.2932 |
| S4 | aspheric | 3.4170 | 0.7278 | | | −22.7025 |
| S5 | aspheric | 3.1450 | 0.2500 | 1.546 | 56.11 | −47.9338 |
| S6 | aspheric | 3.0314 | 0.7014 | | | −48.5016 |
| S7 | aspheric | 15.8451 | 0.1611 | 1.546 | 56.11 | 37.9757 |
| S8 | aspheric | 12.8504 | 0.1180 | | | −46.2747 |
| S9 | aspheric | −4.7581 | 0.4244 | 1.666 | 20.41 | −5.2260 |
| S10 | aspheric | −1241.0189 | 0.0834 | | | −99.0000 |
| S11 | spherical | infinite | 0.2111 | 1.517 | 64.17 | |
| S12 | spherical | infinite | 0.8823 | | | |
| S13 | spherical | infinite | | | | |

TABLE 11

| surface number | A4 | A6 | A8 | A10 | A12 | A14 | A16 | A18 |
|---|---|---|---|---|---|---|---|---|
| S1 | 4.0917E−02 | −1.9082E−02 | 1.2767E−01 | −3.8230E−01 | 6.4939E−01 | −6.4031E−01 | 3.3494E−01 | −7.4079E−02 |
| S2 | −7.6548E−02 | 3.1787E−02 | 1.3601E−01 | 4.9397E−01 | 5.2300E−01 | −2.5017E−01 | 5.6643E−02 | 4.9478E−03 |
| S3 | −1.1890E−01 | 3.4086E−01 | −4.2288E−01 | 7.7400E−01 | −2.4148E+00 | 3.8964E+00 | −2.8197E+00 | 7.5576E−01 |
| S4 | 1.2235E−02 | 6.2866E−01 | −2.9905E+00 | 1.3955E+01 | 4.1134E+01 | 7.0555E+01 | −6.4654E+01 | 2.4743E+01 |
| S5 | −1.1875E−01 | −1.4006E−01 | 1.3481E+00 | −4.4313E+00 | 9.9481E+00 | −1.3810E+01 | 1.0286E+01 | −3.1576E+00 |
| S6 | −1.1459E−01 | −8.5350E−02 | 1.0017E+00 | −2.6063E+00 | 4.9953E+00 | −5.9648E+00 | 3.7450E+00 | −9.5364E−01 |
| S7 | 1.3444E−01 | −2.0077E+00 | 3.3802E+00 | −2.6534E+00 | 1.1909E+00 | −3.4634E−01 | 7.3159E−02 | −9.1541E−03 |
| S8 | 7.5370E−01 | −3.1492E+00 | 5.5603E+00 | −5.7539E+00 | 3.6769E+00 | −1.4172E+00 | 2.9989E−01 | −2.6615E−02 |
| S9 | 2.6012E−01 | −6.6132E−01 | 1.1209E+00 | −1.1444E+00 | 6.9281E−01 | −2.4398E−01 | 4.6269E−02 | −3.6657E−03 |
| S10 | −2.0048E−01 | 1.0326E−01 | 8.6343E−02 | −1.2645E−01 | 5.8179E−02 | −1.1099E−02 | 4.9446E−04 | 5.5441E−05 |

Embodiment 5

An imaging lens assembly according to Embodiment 5 of the present disclosure is described below with reference to FIGS. 9-10D. FIG. 9 is a schematic structural diagram illustrating the imaging lens assembly according to Embodiment 5 of the present disclosure.

As shown in FIG. 9, the imaging lens assembly includes, along an optical axis, five lenses E1-E5 arranged in sequence from an object side to an image side. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10. Alternatively, the imaging lens assembly may further include an optical filter E6 having an object-side surface S11 and an image-side surface S12. In the imaging lens assembly of this embodiment, a diaphragm STO for limiting light beams may also be disposed, for example, between the second Lens E2 and the third lens E3, to improve the image quality. Light from an object sequentially passes through the surfaces S1-S12 and finally forms an image on an image plane S13.

Table 13 shows the surface type, the radius of curvature, the thickness, the material and the conic coefficient of each lens of the imaging lens assembly in Embodiment 5. The radius of curvature and the thickness are shown in millimeters (mm). Table 14 shows the high-order coefficients of each aspheric mirror surface in Embodiment 5. Table 15 shows the focal lengths f1-f5 of the lenses, the effective focal length f of the imaging lens assembly, the axial distance TTL from the object-side surface S1 of the first lens E1 to the image plane S13, and the half of the diagonal length ImgH of the effective pixel area on the image plane S13 in Embodiment 5. Here, the surface type of each aspheric surface may be defined by the formula (1) given in Embodiment 1.

TABLE 13

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.5395 | 0.9138 | 1.546 | 56.11 | −0.5579 |
| S2 | aspheric | −4.0592 | 0.0748 | | | −59.8754 |
| S3 | aspheric | −11.0061 | 0.2350 | 1.666 | 20.41 | 21.4878 |
| S4 | aspheric | 3.1052 | 0.1281 | | | −20.7191 |
| STO | spherical | infinite | 0.7943 | | | 0.0000 |
| S5 | aspheric | −28.1509 | 0.2350 | 1.546 | 56.11 | −99.0000 |
| S6 | aspheric | 4.3482 | 0.4900 | | | −88.9915 |
| S7 | aspheric | −5.7766 | 0.5778 | 1.666 | 20.41 | 15.0833 |
| S8 | aspheric | −3.0779 | 0.2748 | | | −10.5228 |
| S9 | aspheric | −2.8381 | 0.3803 | 1.546 | 56.11 | −10.5384 |
| S10 | aspheric | −32.7559 | 0.3677 | | | 99.0000 |
| S11 | spherical | infinite | 0.2106 | 1.517 | 64.17 | |
| S12 | spherical | infinite | 0.2677 | | | |
| S13 | spherical | infinite | | | | |

TABLE 14

| surface number | A4 | A6 | A8 | A10 | A12 |
|---|---|---|---|---|---|
| S1 | 1.5324E−02 | −6.1635E−03 | 3.5694E−02 | −8.8750E−02 | 1.3528E−01 |
| S2 | 3.9700E−03 | −2.8207E−02 | 1.5623E−01 | −3.6247E−01 | 4.7349E−01 |
| S3 | −5.7449E−03 | −1.0044E−01 | 5.2359E−01 | −9.2786E−01 | 3.1155E−01 |
| S4 | −5.7335E−02 | 1.3575E−01 | −1.0082E+00 | 6.6445E+00 | −2.4436E+01 |
| S5 | −4.5665E−01 | −4.8836E−01 | 7.8199E+00 | −5.2970E+01 | 2.2376E+02 |
| S6 | −2.9206E−01 | −5.2057E−02 | 1.3304E+00 | −5.2741E+00 | 1.5098E+01 |
| S7 | −1.1606E−01 | 1.9581E−01 | −1.5513E+00 | 4.9322E+00 | −9.7733E+00 |
| S8 | −1.2630E−01 | 3.8321E−01 | −1.2964E+00 | 2.2242E+00 | −2.2816E+00 |
| S9 | −2.8286E−01 | 9.3346E−01 | −2.2525E+00 | 3.2091E+00 | −2.7697E+00 |
| S10 | −2.1864E−01 | 4.4156E−01 | −7.7441E−01 | 8.5727E−01 | −5.9758E−01 |

| surface number | A14 | A16 | A18 | A20 |
|---|---|---|---|---|
| S1 | −1.3032E−01 | 7.6610E−02 | −2.5634E−02 | 3.6612E−03 |
| S2 | −3.8490E−01 | 1.9328E−01 | −5.5263E−02 | 6.9572E−03 |
| S3 | 1.5597E+00 | −2.7985E+00 | 1.9755E+00 | −5.2873E−01 |
| S4 | 5.2291E+01 | −6.5128E+01 | 4.3706E+01 | −1.2172E+01 |
| S5 | −5.9253E+02 | 9.5621E+02 | −8.5800E+02 | 3.2725E+02 |
| S6 | −2.7298E+01 | 2.9851E+01 | −1.7792E+01 | 4.3207E+00 |
| S7 | 1.2608E+01 | −1.0189E+01 | 4.7051E+00 | −9.4788E−01 |
| S8 | 1.4679E+00 | −5.9148E−01 | 1.4079E−01 | −1.5512E−02 |
| S9 | 1.4671E+00 | 4.6549E−01 | 8.1220E−02 | −6.0015E−03 |
| S10 | 2.6332E−01 | −7.1573E−02 | 1.0988E−02 | −7.2909E−04 |

TABLE 15

| | | | |
|---|---|---|---|
| f1(mm) | 2.17 | f(mm) | 5.29 |
| f2(mm) | −4.66 | TTL(mm) | 4.95 |
| f3(mm) | −6.88 | ImgH(mm) | 2.37 |
| f4(mm) | 9.11 | | |
| f5(mm) | −5.92 | | |

Figures 10C, 10D:
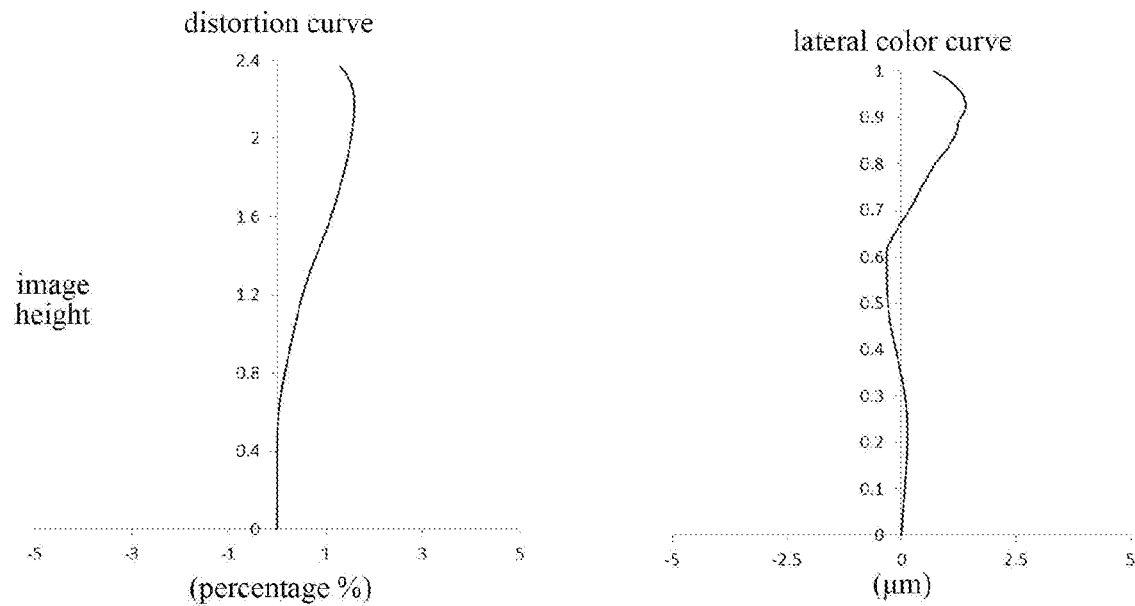

FIG. 10A illustrates a longitudinal aberration curve of the imaging lens assembly according to Embodiment 5, representing deviations of focal points of light of different wavelengths converged after passing through an imaging lens assembly. FIG. 10B illustrates an astigmatic curve of the imaging lens assembly according to Embodiment 5, representing a curvature of a tangential image plane and a curvature of a sagittal image plane. FIG. 10C illustrates a distortion curve of the imaging lens assembly according to Embodiment 5, representing amounts of distortion at different viewing angles. FIG. 10D illustrates a lateral color curve of the imaging lens assembly according to Embodiment 5, representing deviations of different image heights on an image plane after light passes through the imaging lens assembly. It can be seen from FIGS. 10A-10D that the imaging lens assembly according to Embodiment 5 can achieve a good image quality.

Embodiment 6

Figure 11:
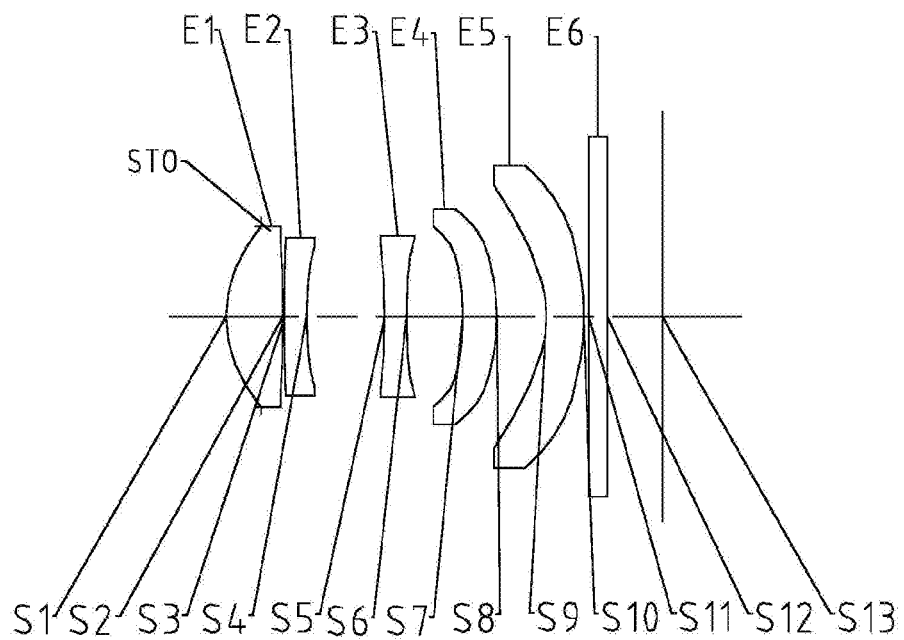
FIG. 11 is a schematic structural diagram illustrating an imaging lens assembly according to Embodiment 6 of the present disclosure.

An imaging lens assembly according to Embodiment 6 of the present disclosure is described below with reference to FIGS. 11-12D. FIG. 11 is a schematic structural diagram illustrating the imaging lens assembly according to Embodiment 6 of the present disclosure.

As shown in FIG. 11, the imaging lens assembly includes, along an optical axis, five lenses E1-E5 arranged in sequence from an object side to an image side. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10. Alternatively, the imaging lens assembly may further include an optical filter E6 having an object-side surface S11 and an image-side surface S12. In the imaging lens assembly of this embodiment, a diaphragm STO for limiting light beams may also be disposed, for example, between the object side and the first lens E1, to improve the image quality. Light from an object sequentially passes through the surfaces S1-S12 and finally forms an image on an image plane S13.

Table 16 shows the surface type, the radius of curvature, the thickness, the material and the conic coefficient of each lens of the imaging lens assembly in Embodiment 6. The radius of curvature and the thickness are shown in millimeters (mm). Table 17 shows the high-order coefficients of each aspheric mirror surface in Embodiment 6. Table 18 shows the focal lengths f1-f5 of the lenses, the effective focal length f of the imaging lens assembly, the axial distance TTL from the object-side surface S1 of the first lens E1 to the image plane S13, and the half of the diagonal length ImgH of the effective pixel area on the image plane S13 in Embodiment 6. Here, the surface type of each aspheric surface may be defined by the formula (1) given in Embodiment 1.

TABLE 16

| surface number | surface type | radius of curvature | thickness | material | | conic coefficient |
|---|---|---|---|---|---|---|
| | | | | refractive index | abbe number | |
| OBJ | spherical | infinite | infinite | | | |
| STO | spherical | infinite | −0.3690 | | | |
| S1 | aspheric | 1.4431 | 0.6475 | 1.546 | 56.11 | −2.2182 |
| S2 | aspheric | 32.4666 | 0.0248 | | | 99.0000 |
| S3 | aspheric | −166.2255 | 0.2500 | 1.666 | 20.41 | −35.4614 |
| S4 | aspheric | 5.9927 | 0.8914 | | | −97.2571 |
| S5 | aspheric | −8.1358 | 0.2500 | 1.546 | 56.11 | −99.0000 |
| S6 | aspheric | 9.6113 | 0.6400 | | | −99.0000 |
| S7 | aspheric | −4.5129 | 0.3935 | 1.666 | 20.41 | −99.0000 |
| S8 | aspheric | −3.1487 | 0.5638 | | | 5.1796 |
| S9 | aspheric | −2.3519 | 0.4249 | 1.546 | 56.11 | −1.2830 |
| S10 | aspheric | infinite | 0.0601 | | | 99.0020 |
| S11 | spherical | infinite | 0.2113 | 1.517 | 64.17 | |
| S12 | spherical | infinite | 0.6292 | | | |
| S13 | spherical | infinite | | | | |

TABLE 17

| surface number | A4 | A6 | A8 | A10 | A12 | A14 | A16 | A18 |
|---|---|---|---|---|---|---|---|---|
| S1 | 4.0543E−02 | −2.2800E−0 | 2.1494E−01 | −7.2775E−01 | 1.4601E+00 | −1.6958E+00 | 1.0647E+00 | −2.8111E−01 |
| S2 | −4.8014E−02 | 7.8489E−02 | −1.1591E−01 | 1.7754E−01 | −1.5955E−01 | −6.4725E−03 | 1.1218E−01 | −6.7459E−02 |
| S3 | −7.7945E−02 | 2.4256E−01 | −2.6703E−01 | 1.6161E−01 | 1.1369E−01 | −4.3631E−01 | 4.3202E−01 | −1.5994E−01 |
| S4 | −5.3131E−02 | 2.0400E−01 | −2.2591E−01 | 6.7490E−02 | 4.1558E−01 | −1.0069E+00 | 9.7729E−01 | −3.5897E−01 |
| S5 | −1.7237E−01 | −6.9298E−02 | 1.0069E+00 | 4.0996E+00 | 9.7401E+00 | −1.3805E+01 | 1.0554E+01 | −3.4222E+00 |
| S6 | −1.0209E−01 | 6.8242E−02 | 1.7415E−01 | −3.9912E−01 | 6.9745E−01 | −7.0983E−01 | 3.3310E−01 | −5.6043E−02 |
| S7 | −7.4889E−02 | −3.2129E−01 | 4.4840E−01 | −4.1948E−01 | 4.3086E−01 | −2.8861E−01 | 9.5124E−02 | −1.1953E−02 |
| S8 | 1.5708E−01 | −4.2920E−01 | 3.7555E−01 | −2.5629E−01 | 1.7389E−01 | −9.6736E−02 | 3.2166E−02 | 4.5272E−03 |
| S9 | 4.5788E−02 | −5.6410E−02 | 6.8694E−02 | −2.5937E−01 | 3.5329E−01 | −2.2590E−01 | 6.9785E−02 | −8.4565E−03 |
| S10 | −1.1578E−01 | 7.4402E−02 | −5.0690E−02 | 1.6343E−03 | 2.4176E−02 | −1.6572E−02 | 4.4209E−03 | 4.2382E−04 |

TABLE 18

| f1(mm) | 2.75 | f(mm) | 5.56 |
|---|---|---|---|
| f2(mm) | −8.67 | TTL(mm) | 4.99 |
| f3(mm) | −8.03 | ImgH(mm) | 2.30 |
| f4(mm) | 14.01 | | |
| f5(mm) | −4.31 | | |

Figure 12A:
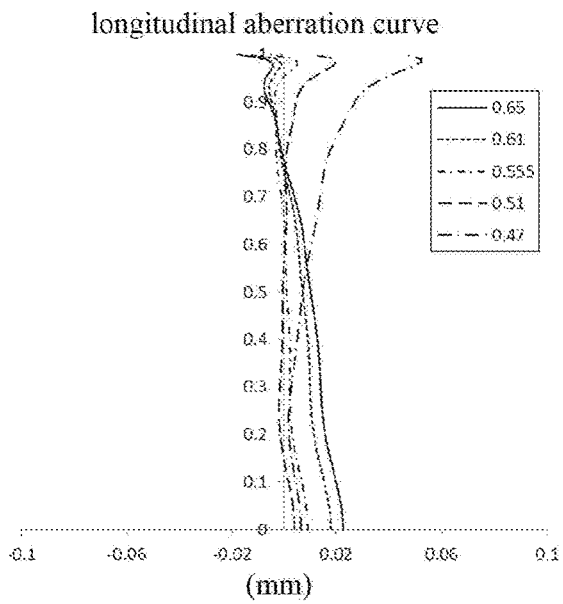
FIGS. 12A-12D respectively illustrate a longitudinal aberration curve, an astigmatic curve, a distortion curve and a lateral color curve of the imaging lens assembly according to Embodiment 6.
Figure 12B:
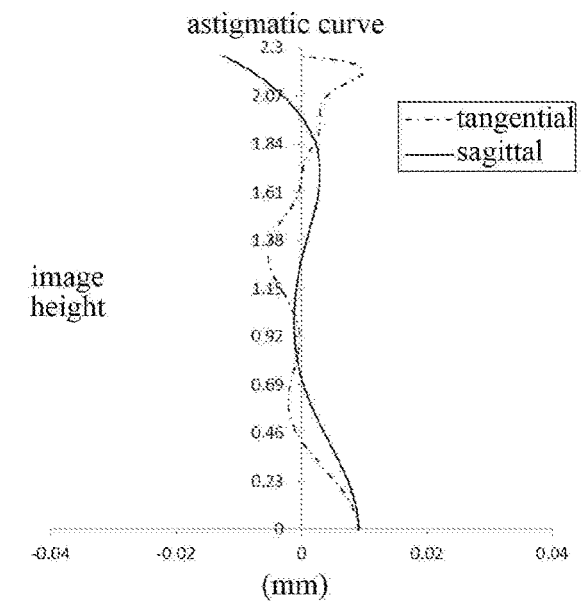
Figure 12C:
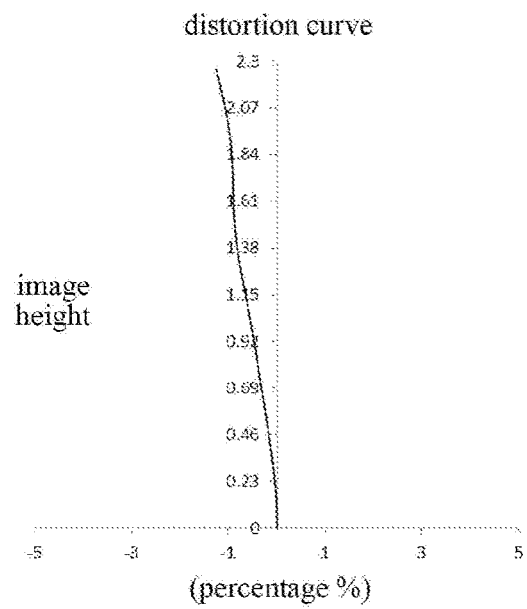
Figure 12D:
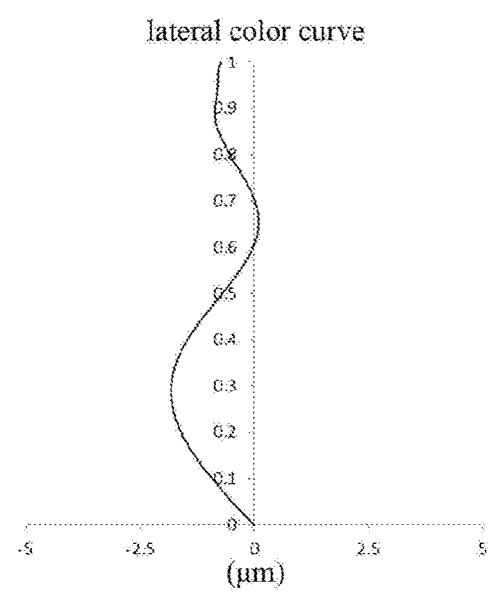

FIG. 12A illustrates a longitudinal aberration curve of the imaging lens assembly according to Embodiment 6, representing deviations of focal points of light of different wavelengths converged after passing through an imaging lens assembly. FIG. 12B illustrates an astigmatic curve of the imaging lens assembly according to Embodiment 6, representing a curvature of a tangential image plane and a curvature of a sagittal image plane. FIG. 12C illustrates a distortion curve of the imaging lens assembly according to Embodiment 6, representing amounts of distortion at different viewing angles. FIG. 12D illustrates a lateral color curve of the imaging lens assembly according to Embodiment 6, representing deviations of different image heights on an image plane after light passes through the imaging lens assembly. It can be seen from FIGS. 12A-12D that the imaging lens assembly according to Embodiment 6 can achieve a good image quality.

Embodiment 7

Figure 13:
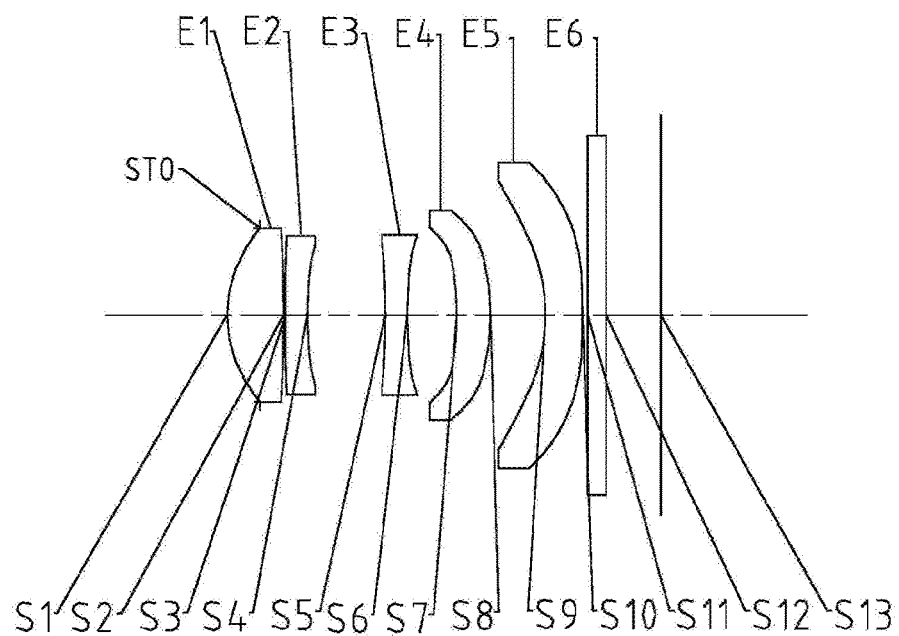
FIG. 13 is a schematic structural diagram illustrating an imaging lens assembly according to Embodiment 7 of the present disclosure.

An imaging lens assembly according to Embodiment 7 of the present disclosure is described below with reference to FIGS. 13-14D. FIG. 13 is a schematic structural diagram illustrating the imaging lens assembly according to Embodiment 7 of the present disclosure.

As shown in FIG. 13, the imaging lens assembly includes, along an optical axis, five lenses E1-E5 arranged in sequence from an object side to an image side. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10. Alternatively, the imaging lens assembly may further include an optical filter E6 having an object-side surface S11 and an image-side surface S12. In the imaging lens assembly of this embodiment, a diaphragm STO for limiting light beams may also be disposed, for example, between the object side and the first lens E1, to improve the image quality. Light from an object sequentially passes through the surfaces S1-S12 and finally forms an image on an image plane S13.

Table 19 shows the surface type, the radius of curvature, the thickness, the material and the conic coefficient of each lens of the imaging lens assembly in Embodiment 7. The radius of curvature and the thickness are shown in millimeters (mm). Table 20 shows the high-order coefficients of each aspheric mirror surface in Embodiment 7. Table 21 shows the focal lengths f1-f5 of the lenses, the effective focal length f of the imaging lens assembly, the axial distance TTL from the object-side surface S1 of the first lens E1 to the image plane S13, and the half of the diagonal length ImgH of the effective pixel area on the image plane S13 in Embodiment 7. Here, the surface type of each aspheric surface may be defined by the formula (1) given in Embodiment 1.

TABLE 19

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.3693 | | | |
| S1 | aspheric | 1.4417 | 0.6490 | 1.546 | 56.11 | −2.5422 |
| S2 | aspheric | 26.7691 | 0.0230 | | | 47.7927 |
| S3 | aspheric | −166.2255 | 0.2500 | 1.666 | 20.41 | −99.0000 |
| S4 | aspheric | 6.2927 | 0.8954 | | | −92.1283 |
| S5 | aspheric | −9.4785 | 0.2500 | 1.546 | 56.11 | −99.0000 |
| S6 | aspheric | 6.8416 | 0.5748 | | | −99.0000 |
| S7 | aspheric | −4.5431 | 0.3881 | 1.666 | 20.41 | −99.0000 |
| S8 | aspheric | −3.1861 | 0.6308 | | | 5.2036 |
| S9 | aspheric | −2.5496 | 0.4249 | 1.546 | 56.11 | −2.7246 |
| S10 | aspheric | −1481.4587 | 0.0603 | | | 99.0020 |
| S11 | spherical | infinite | 0.2113 | 1.517 | 64.17 | |
| S12 | spherical | infinite | 0.6285 | | | |
| S13 | spherical | infinite | | | | |

TABLE 20

| surface number | A4 | A6 | A8 | A10 | A12 |
|---|---|---|---|---|---|
| S1 | 1.0065E−01 | −4.7822E−02 | 1.8232E−01 | 4.8712E−01 | 7.8410E−01 |
| S2 | −2.5929E−01 | 8.4747E−01 | −5.0696E−01 | −4.4616E+00 | 1.3381E+01 |
| S3 | −1.7193E−01 | 8.0602E−01 | −5.9759E−01 | −4.0239E+00 | 1.2676E+01 |
| S4 | 1.1223E−01 | 1.3678E−01 | −6.3479E−01 | 2.1294E+00 | −5.9273E+00 |
| S5 | 2.2976E−02 | 1.8975E−02 | −6.0274E−01 | 2.8138E+00 | −7.4188E+00 |
| S6 | 1.0113E−01 | 9.0249E−02 | −1.0792E+00 | 4.1697E+00 | −9.1879E+00 |
| S7 | −2.5328E−01 | 6.5383E−01 | −3.1363E+00 | 1.0116E+01 | −2.3285E+01 |

TABLE 20-continued

| | | | | | |
|---|---|---|---|---|---|
| S8 | −7.3773E−02 | 4.0579E−01 | −1.5608E+00 | 3.5152E+00 | −5.2498E+00 |
| S9 | −3.3439E−01 | 1.0758E+00 | −2.2513E+00 | 3.0471E+00 | −2.6531E+00 |
| S10 | −3.6417E−01 | 7 4434E−01 | −1.1087E+00 | 1.0635E+00 | −6.5485E−01 |

| surface number | A14 | A16 | A18 | A20 |
|---|---|---|---|---|
| S1 | −7.8743E−01 | 4.5032E−01 | −1.1768E−01 | 0.0000E+00 |
| S2 | −1.6720E+01 | 1.0053E+01 | −2.3892E+00 | 0.0000E+00 |
| S3 | −1.5970E+01 | 9.4943E+00 | −2.1822E+00 | 0.0000E+00 |
| S4 | 1.1249E+01 | −1.1531E+01 | 4.7386E+00 | 0.0000E+00 |
| S5 | 1.1437E+01 | −9.4757E+00 | 3.1889E+00 | 0.0000E+00 |
| S6 | 1.2106E+01 | −8.6684E+00 | 2.6001E+00 | 0.0000E+00 |
| S7 | 3.5397E+01 | −3.3659E+01 | 1.7893E+01 | −3.9725E+00 |
| S8 | 5.1034E+00 | −3.1079E+00 | 1.0760E+00 | −1.5991E−01 |
| S9 | 1.4667E+00 | −4.9608E−01 | 9.3581E−02 | −7.5463E−03 |
| S10 | 2.5695E−01 | −6.2111E−02 | 8.4360E−03 | −4.9316E−04 |

TABLE 21

| f1(mm) | 2.77 | f(mm) | 5.58 |
|---|---|---|---|
| f2(mm) | −9.09 | TTL(mm) | 4.99 |
| f3(mm) | −7.24 | ImgH(mm) | 2.30 |
| f4(mm) | 14.36 | | |
| f5(mm) | −4.68 | | |

Figures 14A, 14B:
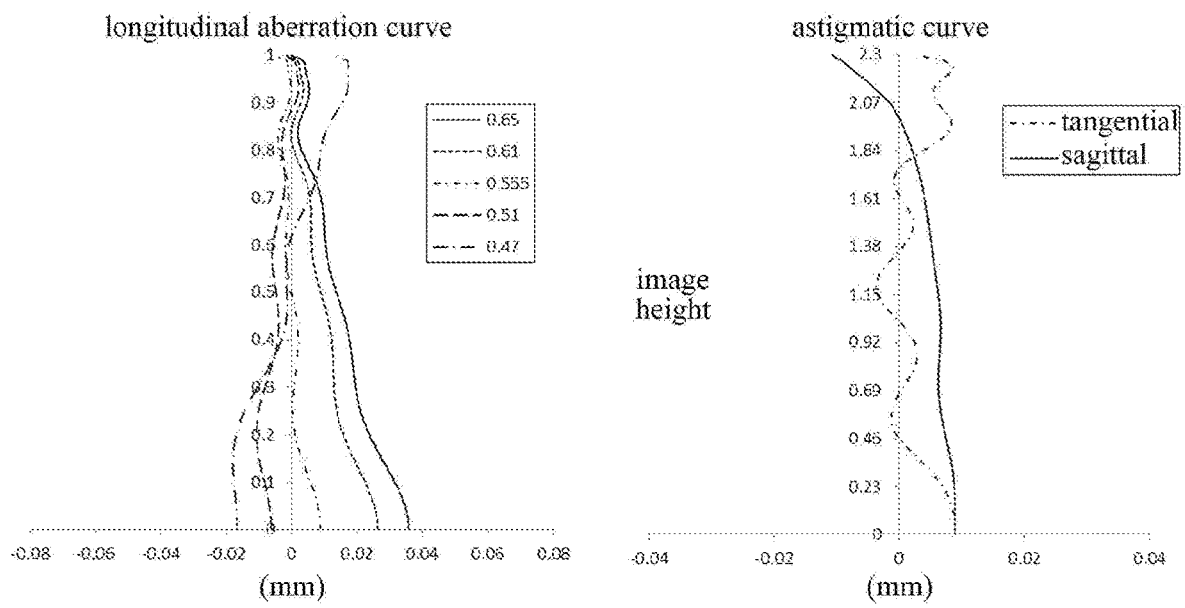

FIG. 14A illustrates a longitudinal aberration curve of the imaging lens assembly according to Embodiment 7, representing deviations of focal points of light of different wavelengths converged after passing through an imaging lens assembly. FIG. 14B illustrates an astigmatic curve of the imaging lens assembly according to Embodiment 7, representing a curvature of a tangential image plane and a curvature of a sagittal image plane. FIG. 14C illustrates a distortion curve of the imaging lens assembly according to Embodiment 7, representing amounts of distortion at different viewing angles. FIG. 14D illustrates a lateral color curve of the imaging lens assembly according to Embodiment 7, representing deviations of different image heights on an image plane after light passes through the imaging lens assembly. It can be seen from FIGS. 14A-14D that the imaging lens assembly according to Embodiment 7 can achieve a good image quality.

Embodiment 8

An imaging lens assembly according to Embodiment 8 of the present disclosure is described below with reference to FIGS. 15-16D. FIG. 15 is a schematic structural diagram illustrating the imaging lens assembly according to Embodiment 8 of the present disclosure.

As shown in FIG. 15, the imaging lens assembly includes, along an optical axis, five lenses E1-E5 arranged in sequence from an object side to an image side. The first lens E1 has an object-side surface S1 and an image-side surface S2. The second lens E2 has an object-side surface S3 and an image-side surface S4. The third lens E3 has an object-side surface S5 and an image-side surface S6. The fourth lens E4 has an object-side surface S7 and an image-side surface S8. The fifth lens E5 has an object-side surface S9 and an image-side surface S10. Alternatively, the imaging lens assembly may further include an optical filter E6 having an object-side surface S11 and an image-side surface S12. In the imaging lens assembly of this embodiment, a diaphragm STO for limiting light beams may also be disposed, for example, between the second lens E2 and the third lens E3, to improve the image quality. Light from an object sequentially passes through the surfaces S1-S12 and finally forms an image on an image plane S13.

Table 22 shows the surface type, the radius of curvature, the thickness, the material and the conic coefficient of each lens of the imaging lens assembly in Embodiment 8. The radius of curvature and the thickness are shown in millimeters (mm). Table 23 shows the high-order coefficients of each aspheric mirror surface in Embodiment 8. Table 24 shows the focal lengths f1-f5 of the lenses, the effective focal length f of the imaging lens assembly, the axial distance TTL from the object-side surface S1 of the first lens E1 to the image plane S13, and the half of the diagonal length ImgH of the effective pixel area on the image plane S13 in Embodiment 8. Here, the surface type of each aspheric surface may be defined by the formula (1) given in Embodiment 1.

TABLE 22

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 1.4615 | 0.9066 | 1.546 | 56.11 | −0.5564 |
| S2 | aspheric | −8.2798 | 0.0584 | | | −62.5439 |
| S3 | aspheric | −18.0061 | 0.2350 | 1.666 | 20.41 | 31.6285 |
| S4 | aspheric | 3.7552 | 0.1281 | | | −21.6059 |
| STO | spherical | infinite | 0.7943 | | | 0.0000 |
| S5 | aspheric | −187.3800 | 0.2513 | 1.546 | 56.11 | 99.0000 |
| S6 | aspheric | 3.3911 | 0.4900 | | | −83.9143 |
| S7 | aspheric | −5.8340 | 0.6797 | 1.666 | 20.41 | 7.2908 |
| S8 | aspheric | −3.3391 | 0.2039 | | | −8.3409 |
| S9 | aspheric | −3.2455 | 0.3807 | 1.546 | 56.11 | −11.4036 |
| S10 | aspheric | −30.8919 | 0.3557 | | | 89.9211 |

TABLE 22-continued

| surface number | surface type | radius of curvature | thickness | material refractive index | abbe number | conic coefficient |
|---|---|---|---|---|---|---|
| S11 | spherical | infinite | 0.2106 | 1.517 | 64.17 | |
| S12 | spherical | infinite | 0.2557 | | | |
| S13 | spherical | infinite | | | | |

TABLE 23

| surface number | A4 | A6 | A8 | A10 | A12 |
|---|---|---|---|---|---|
| S1 | 1.8905E−02 | −9.8823E−03 | 6.4286E−02 | −1.7333E−01 | 2.9271E−01 |
| S2 | −2.7594E−02 | 1.9051E−01 | −5.8519E−01 | 1.3355E+00 | −2.2266E+00 |
| S3 | −8.7660E−02 | 3.6810E−01 | −1.0840E+00 | 2.9926E+00 | −6.2030E+00 |
| S4 | −4.1953E−02 | 3.0292E−01 | −1.5617E+00 | 7.1124E+00 | −2.0167E+01 |
| S5 | −4.5548E−01 | −1.9325E−01 | 3.6485E+00 | −2.1342E+01 | 7.7867E+01 |
| S6 | −1.6046E−01 | −6.5932E−01 | 3.5376E+00 | −1.1554E+01 | 2.7212E+01 |
| S7 | −9.8858E−02 | −4.2485E−02 | −3.7683E−01 | 1.4249E+00 | −3.0263E+00 |
| S8 | −6.6181E−02 | 4.2388E−02 | −2.9661E−01 | 5.5383E−01 | −5.5267E−01 |
| S9 | −1.6839E−01 | 3.1101E−01 | −6.9496E−01 | 1.0192E+00 | −8.9221E−01 |
| S10 | −0.161762925 | 1.9532E−01 | −0.27162823 | 2.8605E−01 | −1.9757E−01 |

| surface number | A14 | A16 | A18 | A20 |
|---|---|---|---|---|
| S1 | −3.1297E−01 | 2.0222E−01 | −7.2620E−02 | 1.0645E−02 |
| S2 | 2.4887E+00 | −1.7424E+00 | 6.8481E−01 | −1.1497E−01 |
| S3 | 8.6367E+00 | −7.4665E+00 | 3.6007E+00 | −7.3767E−01 |
| S4 | 3.3034E+01 | −2.7298E+01 | 6.5057E+00 | 2.6526E+00 |
| S5 | −1.8156E+02 | 2.6432E+02 | −2.1825E+02 | 7.7387E+01 |
| S6 | −4.3219E+01 | 4.4056E+01 | −2.5843E+01 | 6.5591E+00 |
| S7 | 4.0019E+00 | −3.1814E+00 | 1.4354E+00 | −2.8671E−01 |
| S8 | 3.2933E−01 | −1.2030E−01 | 2.6364E−02 | −2.7810E−03 |
| S9 | 4.6697E−01 | −1.4323E−01 | 2.3781E−02 | −1.6540E−03 |
| S10 | 8.5845E−02 | −2.2765E−02 | 3.3797E−03 | −2.1530E−04 |

TABLE 24

| f1(mm) | 2.35 | f(mm) | 5.29 |
|---|---|---|---|
| f2(mm) | −5.63 | TTL(mm) | 4.95 |
| f3(mm) | −6.10 | ImgH(mm) | 2.36 |
| f4(mm) | 10.56 | | |
| f5(mm) | −6.68 | | |

Figure 16A:
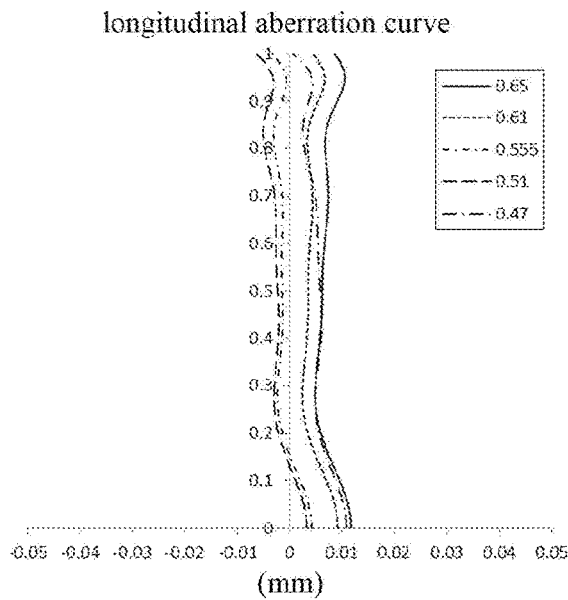
FIGS. 16A-16D respectively illustrate a longitudinal aberration curve, an astigmatic curve, a distortion curve and a lateral color curve of the imaging lens assembly according to Embodiment 8.
Figure 16B:
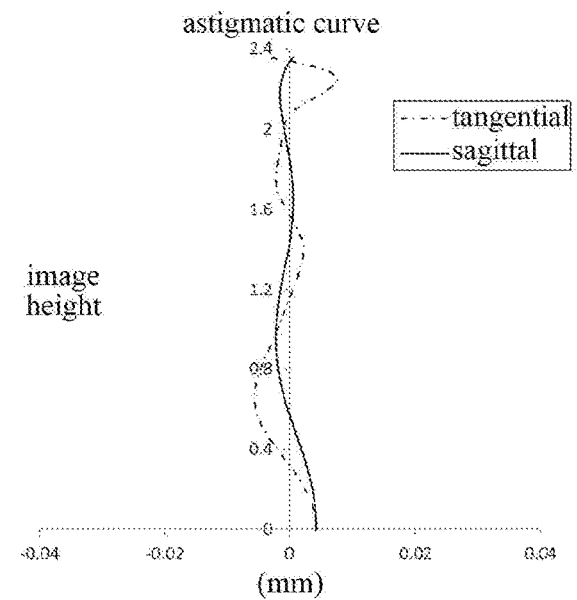
Figure 16C:
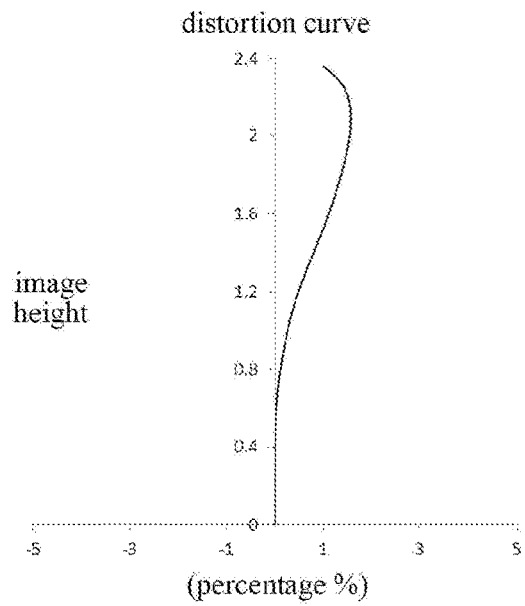
Figure 16D:
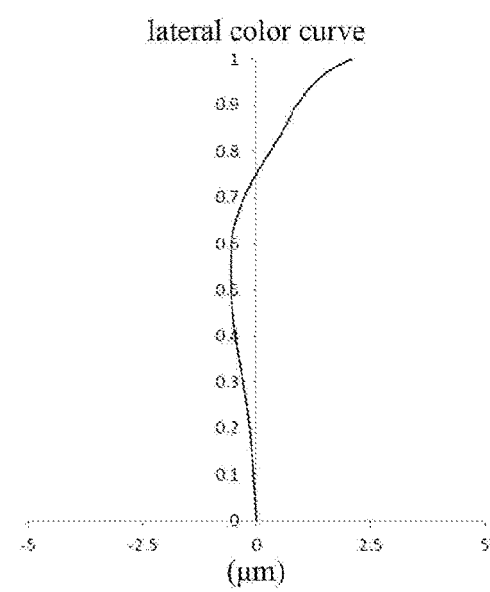

FIG. 16A illustrates a longitudinal aberration curve of the imaging lens assembly according to Embodiment 8, representing deviations of focal points of light of different wavelengths converged after passing through an imaging lens assembly. FIG. 16B illustrates an astigmatic curve of the imaging lens assembly according to Embodiment 8, representing a curvature of a tangential image plane and a curvature of a sagittal image plane. FIG. 16C illustrates a distortion curve of the imaging lens assembly according to Embodiment 8, representing amounts of distortion at different viewing angles. FIG. 16D illustrates a lateral color curve of the imaging lens assembly according to Embodiment 8, representing deviations of different image heights on an image plane after light passes through the imaging lens assembly. It can be seen from FIGS. 16A-16D that the imaging lens assembly according to Embodiment 8 can achieve a good image quality.

To sum up, Embodiments 1-8 respectively satisfy the relationships shown in Table 25 below.

TABLE 25

| Conditional expression | Embodiment | | | | | | | |
|---|---|---|---|---|---|---|---|---|
| | 1 | 2 | 3 | 4 | 5 | 6 | 7 | 8 |
| HFOV (°) | 22.2 | 22.3 | 23.8 | 22.3 | 23.9 | 22.3 | 22.3 | 23.9 |
| T23/T34 | 1.21 | 1.46 | 1.88 | 1.04 | 1.88 | 1.39 | 1.56 | 1.88 |
| TTL/f | 0.88 | 0.91 | 0.92 | 0.89 | 0.94 | 0.90 | 0.89 | 0.94 |
| f2/f1 | −2.12 | −2.31 | −1.72 | −1.62 | −1.66 | −3.16 | −3.29 | −1.97 |
| f12/f45 | −0.48 | −0.45 | −0.26 | −0.70 | −0.25 | −0.58 | −0.52 | −0.22 |
| f/f3 | −0.79 | −0.41 | −0.95 | −0.01 | −0.77 | −0.69 | −0.77 | −0.87 |
| |V4 − V5| | 35.70 | 35.70 | 35.70 | 35.70 | 35.70 | 35.70 | 35.70 | 35.70 |
| f1*f2/f5 (mm) | 3.18 | 0.89 | 1.04 | 1.89 | 1.37 | 5.53 | 5.38 | 1.64 |
| (R1 + R4)/ (R1 − R4) | −2.25 | −1.26 | −2.88 | −2.47 | −2.97 | −1.63 | −1.59 | −2.27 |
| f/f5 | −1.43 | −0.27 | −0.73 | −0.78 | −0.93 | −1.29 | −1.19 | −0.79 |
| (f3 − f4)/ (f3 + f4) | −10.92 | −0.10 | −2.16 | 0.69 | −7.19 | −3.68 | −3.03 | −3.73 |
| R1/R2 | −0.10 | 0.05 | −0.40 | 0.11 | −0.38 | 0.04 | 0.05 | −0.18 |

The present disclosure further provides an imaging device, having a photosensitive element which may be a photosensitive charge-coupled device (CCD) or a complementary metal-oxide semiconductor (CMOS) element. The imaging device may be an independent imaging device such as a digital camera, or may be an imaging module integrated in a mobile electronic device such as a mobile phone. The imaging device is equipped with the imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

What is claimed is:

1. An imaging lens assembly, comprising, sequentially from an object side to an image side along an optical axis, a first lens, a second lens, a third lens, a fourth lens and a fifth lens, wherein the first lens has a positive refractive power, and an object-side surface of the first lens is a convex surface;

the second lens has a negative refractive power, and an object-side surface and an image-side surface of the second lens are concave surfaces;

the third lens has a negative refractive power;

the fourth lens has a positive refractive power or a negative refractive power;

the fifth lens has a positive refractive power or a negative refractive power, an object-side surface of the fifth lens is a concave surface, and an image-side surface of the fifth lens is a convex surface or a plane; and an air spacing T23 between the second lens and the third lens on the optical axis and an air spacing T34 between the third lens and the fourth lens on the optical axis satisfy: $1.0 \leq T23/T34 < 2.0$, and half of a maximal field-of-view HFOV of the imaging lens assembly satisfies: $HFOV \leq 25°$.

2. The imaging lens assembly according to claim 1, wherein an axial distance TTL from the object-side surface of the first lens to an image plane of the imaging lens assembly and an effective focal length f of the imaging lens assembly satisfy: $TTL/f \leq 1.0$.

3. The imaging lens assembly according to claim 1, wherein an effective focal length f of the imaging lens assembly and a focal length f3 of the third lens satisfy: $-1 \leq f/f3 \leq 0$.

4. The imaging lens assembly according to claim 1, wherein an abbe number V4 of the fourth lens and an abbe number V5 of the fifth lens satisfy: $28 \leq |V4-V5|$.

5. The imaging lens assembly according to claim 1, wherein an effective focal length f of the imaging lens assembly and a focal length f5 of the fifth lens satisfy: $-1.5 \leq f/f5 \leq 0$.

6. The imaging lens assembly according to claim 1, wherein a focal length f3 of the third lens and a focal length f4 of the fourth lens satisfy: $-11 \leq (f3-f4)/(f3+f4) \leq 1$.

7. An imaging lens assembly, comprising, sequentially from an object side to an image side along an optical axis, a first lens, a second lens, a third lens, a fourth lens and a fifth lens, wherein the first lens has a positive refractive power, and an object-side surface of the first lens is a convex surface;

the second lens has a negative refractive power, and an object-side surface and an image-side surface of the second lens are concave surfaces;

the third lens has a negative refractive power;

the fourth lens has a positive refractive power or a negative refractive power;

the fifth lens has a positive refractive power or a negative refractive power, an object-side surface of the fifth lens is a concave surface, and an image-side surface of the fifth lens is a convex surface or a plane; and an air spacing T23 between the second lens and the third lens on the optical axis and an air spacing T34 between the third lens and the fourth lens on the optical axis satisfy: $1.0 \leq T23/T34 < 2.0$, and an axial distance TTL from the object-side surface of the first lens to an image plane of the imaging lens assembly and an effective focal length f of the imaging lens assembly satisfy: $TTL/f \leq 1.0$.

8. The imaging lens assembly according to claim 7, wherein an effective focal length f of the imaging lens assembly and a focal length f3 of the third lens satisfy: $-1 \leq f/f3 \leq 0$.

9. The imaging lens assembly according to claim 7, wherein an effective focal length f of the imaging lens assembly and a focal length f5 of the fifth lens satisfy: $-1.5 \leq f/f5 \leq 0$.

10. The imaging lens assembly according to claim 7, wherein a focal length f3 of the third lens and a focal length f4 of the fourth lens satisfy: $-11 \leq (f3-f4)/(f3+f4) \leq 1$.

11. An imaging lens assembly, comprising, sequentially from an object side to an image side along an optical axis, a first lens, a second lens, a third lens, a fourth lens and a fifth lens, wherein the first lens has a positive refractive power, and an object-side surface of the first lens is a convex surface;

the second lens has a negative refractive power, and an object-side surface and an image-side surface of the second lens are concave surfaces;

the third lens has a negative refractive power;

the fourth lens has a positive refractive power or a negative refractive power;

the fifth lens has a positive refractive power or a negative refractive power, an object-side surface of the fifth lens is a concave surface, and an image-side surface of the fifth lens is a convex surface or a plane; and an air spacing T23 between the second lens and the third lens on the optical axis and an air spacing T34 between the third lens and the fourth lens on the optical axis satisfy: $1.0 \leq T23/T34 < 2.0$, and an abbe number V4 of the fourth lens and an abbe number V5 of the fifth lens satisfy: $28 \leq |V4-V5|$.

12. The imaging lens assembly according to claim 11, wherein an effective focal length f of the imaging lens assembly and a focal length f3 of the third lens satisfy: $-1 \leq f/f3 \leq 0$.

13. The imaging lens assembly according to claim 11, wherein an effective focal length f of the imaging lens assembly and a focal length f5 of the fifth lens satisfy: $-1.5 \leq f/f5 \leq 0$.

14. The imaging lens assembly according to claim 11, wherein a focal length f3 of the third lens and a focal length f4 of the fourth lens satisfy: $-11 \leq (f3-f4)/(f3+f4) \leq 1$.

* * * * *